US006589634B2

(12) United States Patent
Schultz et al.

(10) Patent No.: US 6,589,634 B2
(45) Date of Patent: Jul. 8, 2003

(54) EMBOSSING AND LAMINATING IRREGULAR BONDING PATTERNS

(75) Inventors: Walter T. Schultz, Appleton, WI (US); William J. Raynor, Jr., Appleton, WI (US); James Jay Tanner, Winneconne, WI (US); David G. Biggs, Neenah, WI (US); Bernhardt E. Kressner, Appleton, WI (US); Mark D. Perkins, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 141 days.

(21) Appl. No.: 09/804,941

(22) Filed: Mar. 13, 2001

(65) Prior Publication Data

US 2002/0155257 A1 Oct. 24, 2002

Related U.S. Application Data

(62) Division of application No. 09/275,927, filed on Mar. 24, 1999.

(60) Provisional application No. 60/114,435, filed on Dec. 31, 1998.

(51) Int. Cl.[7] .................................................. B32B 3/00

(52) U.S. Cl. ........................ 428/195; 428/201; 428/207

(58) Field of Search ................................ 428/195, 198, 428/201, 207

(56) References Cited

U.S. PATENT DOCUMENTS

D47,834 S 9/1915 Slayter
1,863,973 A 6/1932 Ellis, Jr.

(List continued on next page.)

FOREIGN PATENT DOCUMENTS

| | | |
|---|---|---|
| EP | 0 426 548 B1 | 5/1991 |
| WO | WO 93/11929 A1 | 6/1993 |
| WO | WO 94/29524 A1 | 12/1994 |
| WO | WO 95/02089 A1 | 1/1995 |
| WO | WO 95/27429 A1 | 10/1995 |
| WO | WO 97/20688 | 6/1997 |

OTHER PUBLICATIONS

Product Alert, Apr. 11, 1988, Sparkle Paper Towels, Georgia–Pacific Corp., abstract.

Product Alert, Jul. 20, 1992, Sparkle Microwave Paper Towels, Georgia–Pacific Corp., abstract.

Product Alert, Sep. 19, 1994, Sparkle Big Roll Paper Towels, Georgia–Pacific Corp., abstract.

(List continued on next page.)

*Primary Examiner*—Merrick Dixon
(74) *Attorney, Agent, or Firm*—Judy Garot

(57) ABSTRACT

Webs can be embossed and laminated using irregular bonding patterns with the pin-on-pin embossing process. Different patterns are provided onto each web and the webs are joined in a bonding nip to form a laminate. The bonding pattern formed in the bonding nip is irregular. The irregularity of the bonding pattern reduces vibrations within the machinery and allows increased machine speed. The irregularity of the pattern can be determined using the Self-Similarity Count or the Energy Suppression Factor method.

7 Claims, 29 Drawing Sheets

(7 of 29 Drawing Sheet(s) Filed in Color)

U.S. PATENT DOCUMENTS

| | | | | |
|---|---|---|---|---|
| 3,130,412 | A | 4/1964 | Fox et al. | 161/130 |
| 3,414,459 | A | 12/1968 | Wells | 161/131 |
| 3,556,907 | A | 1/1971 | Nystrand | 156/470 |
| 3,608,047 | A | 9/1971 | Wiggins | 264/286 |
| 3,650,882 | A | 3/1972 | Thomas | 161/122 |
| 3,673,052 | A | 6/1972 | Small et al. | 156/164 |
| 3,684,603 | A | 8/1972 | Iltis | 156/152 |
| 3,708,366 | A | 1/1973 | Donnelly | 156/209 |
| 3,738,905 | A | 6/1973 | Thomas | 161/127 |
| D230,081 | S | 1/1974 | Thomas | D59/2 B |
| D230,311 | S | 2/1974 | Kimura | D59/2 B |
| D230,426 | S | 2/1974 | Moe | D59/2 B |
| D230,427 | S | 2/1974 | Zaid | D59/2 B |
| D230,428 | S | 2/1974 | Lipsitt | D59/2 B |
| D231,018 | S | 3/1974 | Gilling et al. | D59/2 A |
| D231,019 | S | 3/1974 | Gilling et al. | D59/2 A |
| D231,020 | S | 3/1974 | Gilling et al. | D59/2 A |
| D231,021 | S | 3/1974 | Gilling et al. | D59/2 A |
| D231,022 | S | 3/1974 | Thomas | D59/2 A |
| D231,023 | S | 3/1974 | Thomas | D59/2 A |
| D232,772 | S | 9/1974 | Thomas | D59/2 A |
| 3,867,225 | A | 2/1975 | Nystrand | 156/209 |
| 3,868,205 | A | 2/1975 | Thomas | 425/363 |
| 3,920,874 | A | 11/1975 | Dempsey et al. | 428/198 |
| D238,449 | S | 1/1976 | Loveland | D59/2 A |
| D239,137 | S | 3/1976 | Appleman | D59/2 A |
| 3,953,628 | A | 4/1976 | Gannon | 427/442 |
| 3,961,119 | A | 6/1976 | Thomas | 428/178 |
| D240,963 | S | 8/1976 | Pester | D59/2 B |
| D241,071 | S | 8/1976 | Pester | D59/2 B |
| D241,272 | S | 8/1976 | Loveland | D59/2 B |
| D242,284 | S | 11/1976 | Drelich | D59/2 B |
| D242,579 | S | 11/1976 | Walbrun | D59/2 B |
| 4,005,169 | A | 1/1977 | Cumbers | |
| D250,733 | S | 1/1979 | Appleman | D59/2 B |
| D254,333 | S | 2/1980 | Appleman | D59/2 B |
| D255,614 | S | 6/1980 | Appleman et al. | D92/1 C |
| D255,615 | S | 6/1980 | Appleman et al. | D92/1 C |
| D256,062 | S | 7/1980 | Joachim et al. | D92/1 P |
| D256,063 | S | 7/1980 | Burg | D92/1 P |
| D256,286 | S | 8/1980 | Joachim et al. | D92/1 P |
| D257,294 | S | 10/1980 | Gilling et al. | D59/2 B |
| D257,295 | S | 10/1980 | Joachim et al. | D92/1 P |
| D258,154 | S | 2/1981 | Elchook, Jr. et al. | D59/2 C |
| D259,069 | S | 4/1981 | Nixon | D92/1 R |
| D259,219 | S | 5/1981 | Bates et al. | D59/2 B |
| D260,193 | S | 8/1981 | Elchook, Jr. et al. | D59/2 R |
| D261,064 | S | 9/1981 | Kauffman | D59/2 B |
| D261,066 | S | 9/1981 | McElwain | D92/1 |
| D261,067 | S | 9/1981 | McElwain | D92/1 C |
| 4,307,141 | A | 12/1981 | Walbrun | 428/132 |
| D262,747 | S | 1/1982 | Erickson | D59/2 B |
| 4,320,162 | A | 3/1982 | Schulz | 428/154 |
| 4,325,768 | A | 4/1982 | Schulz | 156/206 |
| D264,512 | S | 5/1982 | Rogers | D59/2 B |
| 4,361,085 | A | 11/1982 | Schutz | 101/23 |
| D267,907 | S | 2/1983 | Schulz | D59/2 B |
| 4,376,671 | A | 3/1983 | Schulz | 156/549 |
| D268,961 | S | 5/1983 | Erickson | D59/2 B |
| 4,469,735 | A | 9/1984 | Trokhan | 428/154 |
| 4,483,728 | A | 11/1984 | Bauernfeind | 156/209 |
| 4,546,029 | A | 10/1985 | Cancio et al. | 428/141 |
| D287,433 | S | 12/1986 | Ellers | D59/2 B |
| D288,150 | S | 2/1987 | Schulz et al. | D59/1 |
| 4,671,983 | A | 6/1987 | Burt | 428/179 |
| D296,769 | S | 7/1988 | Schtatz | D59/1 |
| D298,488 | S | 11/1988 | Eliason | D5/27 |
| D298,586 | S | 11/1988 | Drew et al. | D5/27 |
| D298,587 | S | 11/1988 | Peddada | D5/27 |
| D298,588 | S | 11/1988 | Peddada | D5/27 |
| D298,589 | S | 11/1988 | Drew et al. | D5/27 |
| D298,590 | S | 11/1988 | Drew et al. | D5/27 |
| D298,701 | S | 11/1988 | Drew | D5/27 |
| D298,702 | S | 11/1988 | Drew | D5/27 |
| 4,803,032 | A | 2/1989 | Schulz | 264/284 |
| 4,816,320 | A | 3/1989 | St. Cyr | 428/198 |
| D300,693 | S | 4/1989 | Grasso | D59/1 |
| D300,991 | S | 5/1989 | LeGrand | D5/47 |
| D305,181 | S | 12/1989 | Veith | D5/53 |
| D305,182 | S | 12/1989 | Peddada et al. | D5/7 |
| 4,902,366 | A | 2/1990 | Bader | 156/296 |
| D313,510 | S | 1/1991 | Sears | D5/20 |
| D315,990 | S | 4/1991 | Blenke et al. | D5/13 |
| D318,572 | S | 7/1991 | Schultz et al. | D5/53 |
| D319,349 | S | 8/1991 | Schultz et al. | D5/53 |
| D319,350 | S | 8/1991 | Paschke et al. | D5/53 |
| D322,173 | S | 12/1991 | Schultz et al. | D5/53 |
| 5,091,032 | A | 2/1992 | Schulz | 156/219 |
| 5,096,527 | A | 3/1992 | Biagiotti | 156/209 |
| 5,122,221 | A | 6/1992 | Isowa et al. | |
| D331,665 | S | 12/1992 | Underhill | D5/53 |
| 5,171,308 | A | 12/1992 | Gallagher et al. | 604/372 |
| 5,173,351 | A | 12/1992 | Ruppel et al. | 428/1.74 |
| 5,173,851 | A | 12/1992 | Off et al. | 364/401 |
| D332,874 | S | 2/1993 | Shufelt et al. | D5/53 |
| D332,875 | S | 2/1993 | Shufelt et al. | D5/53 |
| D332,876 | S | 2/1993 | Shufelt et al. | D5/53 |
| 5,215,617 | A | 6/1993 | Grupe | 156/209 |
| D341,490 | S | 11/1993 | Curran et al. | D5/57 |
| D341,944 | S | 12/1993 | Peter | D5/53 |
| 5,300,347 | A | 4/1994 | Underhill et al. | 428/171 |
| 5,328,565 | A | 7/1994 | Rasch et al. | 162/113 |
| 5,339,730 | A | 8/1994 | Ruppel et al. | 101/32 |
| D352,833 | S | 11/1994 | Schulz | D5/53 |
| D353,053 | S | 12/1994 | Arnone | D5/53 |
| D354,308 | S | 1/1995 | Cornwell et al. | D19/5 |
| D354,853 | S | 1/1995 | Schulz | D5/24 |
| D354,854 | S | 1/1995 | Schulz | D5/53 |
| D354,855 | S | 1/1995 | Schulz | D5/53 |
| D354,856 | S | 1/1995 | Schulz | D5/53 |
| 5,382,464 | A | 1/1995 | Ruppel et al. | 428/172 |
| D356,688 | S | 3/1995 | Uitenbroek et al. | D5/52 |
| 5,409,572 | A | 4/1995 | Kershaw et al. | 162/109 |
| D358,035 | S | 5/1995 | Zander et al. | D5/53 |
| D358,940 | S | 6/1995 | Samolinski et al. | D5/53 |
| 5,443,889 | A | 8/1995 | Ruppel et al. | 428/172 |
| D361,895 | S | 9/1995 | Armone et al. | D5/53 |
| D362,121 | S | 9/1995 | Nugent et al. | D5/53 |
| D362,967 | S | 10/1995 | Rothwell et al. | D5/53 |
| D363,610 | S | 10/1995 | Saffran et al. | D5/53 |
| D367,764 | S | 3/1996 | Makoui et al. | D5/57 |
| D367,765 | S | 3/1996 | Makoui et al. | D5/57 |
| D367,766 | S | 3/1996 | Makoui et al. | D5/57 |
| D368,587 | S | 4/1996 | Schulz | D5/53 |
| D369,907 | S | 5/1996 | Sayovitz et al. | D5/53 |
| D370,127 | S | 5/1996 | Bonaddio et al. | D5/58 |
| D371,909 | S | 7/1996 | Arnone et al. | D5/20 |
| D371,910 | S | 7/1996 | Schultz | D5/53 |
| D372,587 | S | 8/1996 | Arnone et al. | D5/37 |
| D372,589 | S | 8/1996 | Burgess et al. | D5/53 |
| D373,026 | S | 8/1996 | Delebreau et al. | D5/20 |
| D373,905 | S | 9/1996 | Schulz | D5/53 |
| 5,562,805 | A | 10/1996 | Kamps et al. | 162/117 |
| D375,633 | S | 11/1996 | Spanagel et al. | D5/37 |
| D375,844 | S | 11/1996 | Edwards et al. | D5/47 |
| D377,419 | S | 1/1997 | Schulz | D5/35 |
| D378,875 | S | 4/1997 | Miller et al. | D5/25 |
| D378,876 | S | 4/1997 | Spanagel et al. | D5/37 |
| D381,810 | S | 8/1997 | Schultz et al. | D5/37 |
| D381,811 | S | 8/1997 | du Grosriez | D5/57 |
| D382,118 | S | 8/1997 | Ferrero | D5/53 |

| | | | | |
|---|---|---|---|---|
| D382,119 | S | 8/1997 | Ferrero | D5/53 |
| D382,162 | S | 8/1997 | Ertolacci et al. | D6/595 |
| D382,713 | S | 8/1997 | Giesler, Sr. | D5/53 |
| D383,003 | S | 9/1997 | Hepford | D5/53 |
| D383,310 | S | 9/1997 | Springer | D5/53 |
| D384,210 | S | 9/1997 | du Grosriez | D5/57 |
| D384,508 | S | 10/1997 | Zander et al. | D5/26 |
| D384,819 | S | 10/1997 | Zander et al. | D5/26 |
| D385,707 | S | 11/1997 | Kopacz et al. | D5/53 |
| D386,620 | S | 11/1997 | Giesler | D5/53 |
| D390,362 | S | 2/1998 | Baum et al. | D5/53 |
| D390,363 | S | 2/1998 | Baum et al. | D5/53 |
| D390,708 | S | 2/1998 | Brown | D5/61 |
| D391,400 | S | 3/1998 | Enderby | D5/37 |
| D392,108 | S | 3/1998 | Diggins et al. | D5/57 |
| D393,370 | S | 4/1998 | Schulz et al. | D5/53 |
| D395,553 | S | 6/1998 | Bak et al. | D5/32 |
| D395,955 | S | 7/1998 | Du Grosriez | D5/57 |
| D401,421 | S | 11/1998 | Schulz | D5/53 |
| 6,251,207 | B1 | 6/2001 | Schultz et al. | |

OTHER PUBLICATIONS

Product Alert, Jun. 12, 1995, Sparkle Seasonals Paper Towels, Georgia–Pacific Corp., abstract.

Baxes, Gregory A., "Digital Image Processing—Principles and Applications," John Wiley & Sons, New York, 1994, pp. 176–178.

Gonzales, Rafael C., and Richard E. Woods, "Digital Image Processing," Addison–Wesley Publishing Company, New York, 1992, pp. 109–111.

Koepenick, Martin, "Thoughts on Paper: T. Marshall Hahn, Jr. on the New Georgia–Pacific," *PIMA Magazine*, vol. 72, No. 5, May 1990, pp. 35–38.

Pallini, John J., "Tissue Converting Trends For The 90's," *TAPPI 1991 Tissue Runnability Seminar Notes*, pp. 139–143.

Paper Converting Machine Company, Foot–to–Foot and Nested Embosser Systems brochure, printed Aug. 1996, 4 pages.

FIG. 5
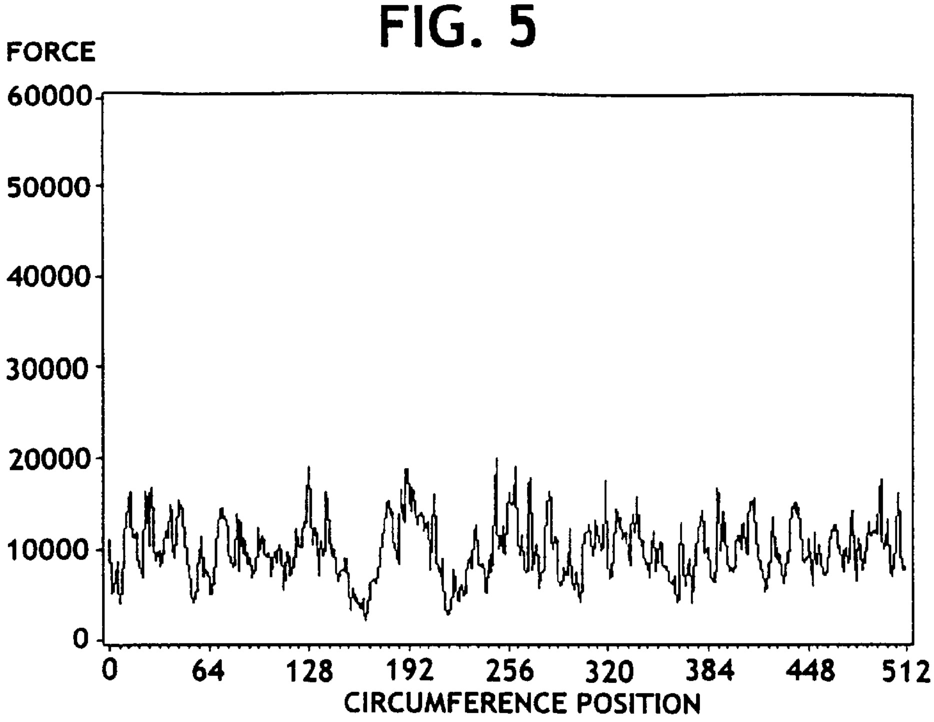
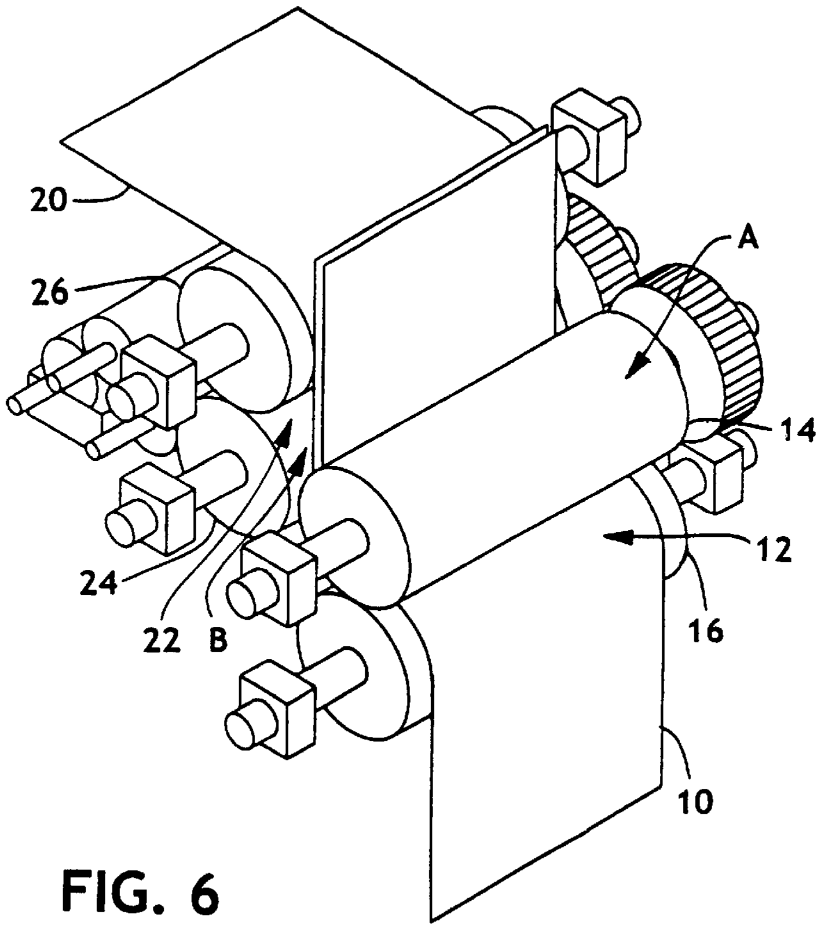
FIG. 6

LEICA Q600    Version V01.06
Routine - ROTATE3.Q5R
Specimen ID: Random Noise (Sqr. Region)
Description: Rotation of Images Thru a Series of Increments 21 Oct 1998  11:15:14

User Name: Dave Biggs
Calibration: 20.5 μm/pixel

| Bin | Area% | Number | Number (%) |
|---|---|---|---|
| 1 | 0.00 - 4.00 | 0 | 0.00 |
| 2 | 4.00 - 8.00 | 0 | 0.00 |
| 3 | 8.00 - 12.0 | 0 | 0.00 |
| 4 | 12.0 - 16.0 | 0 | 0.00 |
| 5 | 16.0 - 20.0 | 0 | 0.00 |
| 6 | 20.0 - 24.0 | 0 | 0.00 |
| 7 | 24.0 - 28.0 | 0 | 0.00 |
| 8 | 28.0 - 32.0 | 0 | 0.00 |
| 9 | 32.0 - 36.0 | 0 | 0.00 |
| 10 | 36.0 - 40.0 | 0 | 0.00 |
| 11 | 40.0 - 44.0 | 3 | 3.30 |
| 12 | 44.0 - 48.0 | 72 | 79.12 |
| 13 | 48.0 - 52.0 | 16 | 17.58 |
| 14 | 52.0 - 56.0 | 0 | 0.00 |
| 15 | 56.0 - 60.0 | 0 | 0.00 |
| 16 | 60.0 - 64.0 | 0 | 0.00 |
| 17 | 64.0 - 68.0 | 0 | 0.00 |
| 18 | 68.0 - 72.0 | 0 | 0.00 |
| 19 | 72.0 - 76.0 | 0 | 0.00 |
| 20 | 76.0 - 80.0 | 0 | 0.00 |
| 21 | 80.0 - 84.0 | 0 | 0.00 |
| 22 | 84.0 - 88.0 | 0 | 0.00 |
| 23 | 88.0 - 92.0 | 0 | 0.00 |
| 24 | 92.0 - 96.0 | 0 | 0.00 |
| 25 | 96.0 - 100 | 0 | 0.00 |

| | | | |
|---|---|---|---|
| Undersize Number: | 0.00 | Total Number: | 91.00 |
| Oversize Number: | 0.00 | Graph division: | 5.00 |

| | |
|---|---|
| Total | 4238.80 |
| Mean | 46.58 |
| Std Dev | 1.40 |
| Std Error | 0.15 |
| Max | 49.79 |
| Min | 43.20 |
| 2-s Range | 5.60 |
| Median | 46.00 |
| Mode | 46.00 |
| Skewness | 0.12 |
| Kurtosis | -0.43 |
| Fields | 91.00 |
| Spec. Area | 55466529.25 |
| Norm. Count | 1.64 |

Degree of Rotation = 175.0
Average Area = 37.18

Original Image

```
Routine Header:
  Number of fields: 1
  Standard Frames
  Results header:
    System and Version, Routine Name, Date and time, Calibration value
    User Name: "Dave Biggs"
    Specimen ID: ""
    Description: "Rotation of Images Thru a Series of Increments"

NAME:  ROTATE2
PURPOSE: Rotates image from 0-180 degrees and measures % Area down the image
CONDITIONS:  Image read off Zip-Disk (512x512 or 1024x1024); image rotation and marching frames
AUTHOR:  Dave Biggs
DATE:  May 12, 1998

Open File   ( C:\QWIN\RHISTO.XLS, channel #1 )

Enter Results Header
MFLDIMAGE = 0
ROTATE.ANGLE = 0
DEGROTATE = 0
ROTATE.SRCX = 255
ROTATE.SRCY = 255
GREYUTILIN = 0
GREYUTILOUT = 1
ROTATE.DESTX = 256
ROTATE.DESTY = 256
ROTATE.WIDTH = 512
ROTATE.HEIGHT = 512
MFRAMEX = 148
MFRAMEH = 4

Image frame   ( x 0,  y 0,  Width 512,  Height 512 )
```

FIG. 31A

```
Read image  [PAUSE]  ( from file C:\QWIN\BUTTERF1.TIF into Image0, type TIF )

For  ( FIELD = 1 to 36, step 1 )

 Grey Util  ( Clear Image1 to 0 )
 ROTATE.ANGLE = DEGROTATE
 Grey Rotate  ( From ROTATE.SRCX, ROTATE.SRCY in GREYUTILIN to ROTATE.DESTX, ROTATE.DESTY in GREYUTILOUT,
     width ROTATE.WIDTH, height ROTATE.HEIGHT, by ROTATE.ANGLE deg )
 MARCH = 24
 TOTAREA = 0

 For  ( FRAME = 1 to 114, step 1 )

  Binary Edit  ( Clear Binary0 )
  MARCH = MARCH+4
  MFRAMEW = 212
  MFRAMEY = MARCH
  Measure frame  ( x MFRAMEX,  y MFRAMEY,  Width MFRAMEW,  Height MFRAMEH )
  Detect  ( blacker than 206, from Image1 into Binary0 delineated )
  Measure field  ( plane MFLDIMAGE, into FLDRESULTS(2) )
    Selected parameters:    Area, Area%
  AREA1 = FLDRESULTS(2)
  TOTAREA = TOTAREA+AREA1
  Display Field Results  ( x -2, y 576, w 524, h 372 )
  Field Histogram #1  ( Y Param Number, X Param Area%, from 0. to 25., linear, 25 bins )
  Display Field Histogram Results  ( #1, horizontal, differential, bins + graph (Y axis linear), statistics )
    Data Window  ( 526, 367, 727, 623 )

 Next  ( FRAME )
 Goto  OUTPUT1
 CONTINUE1:
 Clear Field Histogram #1

 DEGROTATE = DEGROTATE+5
```

FIG. 31B

```
Next   ( FIELD )

OUTPUT1:
Print Results Header
File Field Histogram Results   ( #1, differential, statistics, channel #1 )
Print Field Histogram Results   ( #1, horizontal, differential, bins + graph (Y axis linear), statistics )
Print   ( "Degree of Rotation = ", no tab follows )
Print   ( DEGROTATE, 1 digit after '.', no tab follows )
Print Line
Print   ( "Average Area = ", no tab follows )
Print   ( TOTAREA/114, 2 digits after '.', no tab follows )
If   ( FIELD=36 )

 Goto   CONTINUE2
Else
 Print Page
 Goto   CONTINUE1
Endif

CONTINUE2:
Set Image Position ( left 88 mm, top 125 mm, right 155 mm, bottom 192 mm, Aspect = Image Window,
      Caption:Bottom Centre,"Original Image"  )
Grey Util   ( Print Image0 )

END
```

FIG. 31C

| No. | Pattern ID | ESF |
|---|---|---|
| 1 | Butterfly | 15.5 |
| 2 | Random Noise | 8.43 |
| 3 | Pin-On-Pin | 147.4 |
| 4 | Sparkle | 82.4 |
| 5 | A-Rupple | 36.5 |
| 6 | Checkerboard | 66.3 |
| 7 | Pin-on-Pin on Worms | 14.2 |

EMBOSSING AND LAMINATING IRREGULAR BONDING PATTERNS

This application is a divisional of application Ser. No. 09/275,927 entitled "Embossing And Laminating Irregular Bonding Patterns" and filed in the U.S. Patent and Trademark Office on Mar. 24, 1999, which claims priority from provisional patent application Ser. No. 60/114,435 entitled "Embossing And Laminating Irregular Bonding Patterns" and filed in the U.S. Patent and Trademark Office on Dec. 31, 1998. The entirety of application Ser. No. 09/275,927 is hereby incorporated by reference.

TECHNICAL FIELD

This invention generally relates to bonding patterns used in the embossing and laminating webs of material in the pin-on-pin process and more particularly to the high speed lamination of two embossed webs with an irregular bonding pattern.

BACKGROUND

Paper products such as facial tissue, baby wipers, paper towels, toilet paper and the like are manufactured widely in the paper industry. Each of these products has unique product characteristics that require appropriate blend of product attributes to ensure that the product can be used for the intended purpose and is desired by consumers. These attributes include tensile strength, water absorbency, softness, thickness, stretch and appearance. One method of modifying and altering these properties or attributes includes providing an artistic pattern in or on the paper product. The artistic pattern typically involves a texture which is provided by either variation of density, height, or thickness variation. This texturing is generally done by a process known as embossing.

Prior art embossing processes typically involve contacting the paper product sheet with embossing equipment, which typically involve opposed rolls having a matched male and female embossing means or a metal male embossing roll and a contacting compliant (e.g., rubber) roll. The rolls operate at equal surface speeds, such that the artistic patterns of the rolls align if male and female. The web is embossed as it passes through the nip created by the two rolls.

The controls that are typically applied during embossment are the nip surface speed of the rolls, the pressure between the two rolls or nip pressure; the moisture level of the paper sheet entering the nip; the temperature of the rolls creating the nip; and the type of sheet of paper entering the nip (thickness, fiber type, smoothness, porosity, and chemical treatments). These controls affect the quality of the embossment, which is frequently judged by the clarity or sharpness of the artistic pattern on the sheet, by its uniformity across the sheet (CD or cross direction) and in the direction of motion of the sheet (MD or machine direction), and by the feel or "hand" of the embossed sheet. Adjusting these process parameters provides product variability but often results in a product without the most desirable or competitive product attributes.

It was found that rather than a single thickness or weight of tissue sheet one could dramatically change the properties of the tissue by laminating together two sheets of half the thickness or weight where each sheet had been embossed separately. The manner of laminating the two separately embossed sheets could deliver significantly different properties, softness, absorbency, feel, etc. Prior art has combined the embossing and laminating processes of separate tissue sheets into a single machine. Three different methods are currently available for commercial use for the manufacture of tissue and paper towels: 1) "Pin-on-Pin" or "Point to Point" or "peg-on-peg", 2) "Pin to Grove" or "Glued Nested"; and, 3) "Pin Embossed." The bulk or thickness and absorbency of the laminated two-ply sheet is much greater than the equivalent one-ply. This is shown, for example, by U.S. Pat. No. 3,867,225 to Nystrand.

While the Pin-on-Pin system can produce the best properties, it has associated drawbacks. Pin-on-Pin lamination of two embossed tissue sheets relies upon precise mating or alignment of the artistic patterns of the two separate male embossing elements. After the embossing nip, the two separate sheets are brought together and adhesively attached by pressing the mated protrusions of the male embossing rolls with the sheets between and adhesive between the two tissues. The mating or alignment and pressure at the location where the two male embossing rolls are closest to each other creates the bond points or bond areas of the two tissue sheets. For example, typically there is about a 0.001 inch gap set for the metal protrusions between the two metal rolls for two 20 lb. per ream sheets of tissue. As the production speed increases alignment becomes even more critical because the time of contact is shorter even though the contact forces do not diminish.

If there is even slight rotational or side-to-side misalignment with conventional Pin-on-Pin embossing/laminating, no bonding occurs and hence no acceptable product. Also, as the production speed increases, even when in a state of alignment, the sheet will stop bonding when a limiting speed is reached where vibration produces a "basket-balling" effect, i.e., the laminating rolls appear to bounce apart. This effect opens the gap between the two rolls and relieves the pressure on the bond areas before bonding can occur.

U.S. Pat. No. 3,961,119 to Thomas disclosed that some of the benefit of the Pin-on-Pin embossing/laminating could be achieved by changing from discrete pins to continuous lines for the male artistic patterns of the embossing rolls of the Pin-on-Pin process. By helical design of the line patterns on each of the separate rolls, Thomas caused the two separate bond lines to be approximately 90° to each other. This produced a pinch point, square or diamond, which became a bond and precluded the need for careful alignment of the two rolls. However, this invention did not eliminate the speed limitation as it still caused undue vibration.

U.S. Pat. No. 5,173,851 to Ruppel also addressed the alignment problem by showing how an adequate level of bonding could be achieved by allowing two metal rolls to have dissimilar artistic patterns which can be discontinuous but with a prescribed regularity to produce some minimum level of contact or mating in the nip to create bonded areas of the tissue. Due to the regularity prescribed by Ruppel, the invention still had speed limitations due to deleterious vibrations.

All dynamic machinery and structures have resonant frequencies that can become problems when a regular repeated force excites the resonant condition. See, for example, "Vibration Problems in Engineering" by S. Timoshenko D. Van Nostrand Co. 1928; "Mechanical Vibrations" by William T. Thompson Prentice-Hall, Inc. 1948; "Fundamentals of Vibration Analysis" by N. O. Myklestad, McGraw-Hill 1956. A rather small regular repeating force can induce large amplitude vibration in machinery and supporting structure if the repeated force frequency is just right, i.e., equal or near to one of its critical frequencies or a harmonic of those frequencies.

To offset this adverse phenomena most dynamic machinery is installed with vibration isolation pads or dampers to prevent or mitigate the transmission of deleterious vibrations to other parts of the machinery or supporting structure. Motor mounts and automobile shock absorbers are traditional examples of this. Without shock absorbers the regular repeating force of the paved roadway expansion joints can cause an automobile to bounce wildly and go out of control. This condition does not occur until the automobile has reached or come close to the speed at which these regularly spaced small force pulses are at or near the critical frequency of the automobile suspension system.

Rotating machinery parts are balanced to preclude vibration forces from any small eccentric weight distribution. This is seen in counter weights used on automobile tires and automobile drive shafts. Another method of reducing vibrations includes creating a stiffer, more massive structure to increase the resonant frequency and preclude vibration-induced resonance from being transmitted to the structure or item to be isolated. This is typified by large massive foundation blocks for delicate instruments and for rotating machinery like compressors or turbines. Some machinery can be operated above the critical rotating frequency if one quickly passes through the critical range before the mass can reach a deleterious amplitude of vibration. Some unbalanced machinery vibrates at slow rotational speeds but when it changes from rotation about its geometric center to its dynamic center of inertia the vibration ceases.

The contact point pattern or bonding pattern created by "pin-on-pin" embossing and laminating can be assessed as to its potential for inducing a resonant vibration into the laminating nip rolls. During the roll rotation, the pinch point or pinch region of the nip-where the two sheets are compressed together to produce the lamination bond-produces opposing forces in the rolls. These forces are generally perpendicular to the axis of the roll and tend to open the gap of the nip. If the embossing rolls are an artistic pattern of many dots in regular spacing in both directions, one can readily determine the relative magnitude of the total separating force on the laminating nip of the rolls. This is done by looking at a narrow band of the laminating nip (CD band) at an instant in time, and by measuring the bonding pressure in the laminating nip. By totaling the bond areas multiplied by the bonding pressure of the simultaneous bonding regions of the laminating nip across this narrow band in the CD one can obtain a relative measure of the size of the force at a specific instant in time. The reaction forces normally varies between the supporting bearings of the two embossing rolls and the center point of the rolls. This can be corrected by crowning of the rolls specifically to create a uniform pressure at each bonding point or region of the nip across its width. The centroid of these forces can also be determined to see if it also creates a torsional moment on the rolls. After a small angle of rotation of the two metal laminating rolls, one can calculate the force at the next narrow band of the laminating nip. One can repeat this for 360° of rotation and plot the time history of the force that would be acting to separate the embossing rolls at their nip over one complete revolution. These bonding or pinch points have been plotted for several embossing roll patterns as shown in FIGS. 1–5. These plots are the sum of the bonding point areas from scanning across the pattern in a narrow width corresponding to the nip width, approximately 1/20 inch at 512 successive adjacent positions to the width of about 12.5 inches.

FIG. 1 shows a commercial embossing/laminating system with oval pins at regular 1/8 inch spacing on 20 inch diameter embossing rolls. At a machine speed of 1000 ft/minute, a force pulse of 31,500 units is produced about every 0.63 milliseconds (1600 hertz), or one pulse for each row.

FIGS. 2–4 show forces versus time plots for the traditional patterns known as Ruppel, Floral Oval, and Sparkle, respectively. The regularity of these bonding patterns are revealed in the force versus time plot with a cycle time or period of less than one revolution. For example the pattern disclosed by Ruppel as shown in FIG. 2 repeats about every 7.0 rows or 4.5 milliseconds between force pulses, or a force frequency of about 224 hertz. The relative magnitude of the force, which is considered to be related to the area of contact between the rolls, is the difference between the peak and the valley of the plot or 26,000 force units.

FIG. 5 shows the forces versus time plot for an irregular pattern according to principles of the present invention. As can be seen, the relative magnitude of forces are lower than those forces produced by regular patterns. In addition, due to the irregularity of the bonding pattern, there is less repeating forces thereby reducing the damage caused by repetitive vibrations.

Therefore there exists a need for a pin-on-pin embossing/laminating process to maintain adequate bonding that is capable of achieving high speeds without resonate vibration being induced by the mated lamination (i.e., bonding points) of the two embossing patterns.

SUMMARY

The present invention provides a method and apparatus for embossing and laminating two tissue sheets using pin-on-pin embossing and laminating. The method involves providing patterns on a first and second web. The patterns are dissimilar and the patterns consist of protrusions extending outward from the web. The webs are joined at a bonding nip to form a laminate. The bonded area is between about 3% to 24% of the total area of the laminate. The bonding pattern formed by the two contacting patterns is irregular. The irregularity of the bonding pattern reduces vibrations within the machinery and allows increased machine speed. The irregularity of the pattern is determined using the Self-Similarity Count or the Energy Suppression Factor method.

DESCRIPTION OF THE DRAWINGS

The file of this patent contains at least one photograph executed in color. Copies of this patent with color photograph(s) will be provided by the Patent and Trademark Office upon request and payment of the necessary fee.

FIG. 5 is a plot of the forces produced in a pin-to-pin laminating process using an irregular pattern within the scope of the present invention.

FIG. 6 is an isometric view of the embossing and laminating method of the present invention.

FIG. 31 shows the program utilized in processing the date of the Energy Suppression Factor method.

DETAILED DESCRIPTION

The present invention relates to the process of making an embossed and laminated tissue web using the pin-on-pin process. These are cellulosic tissue webs of creped or uncreped and through dried process that can be used to form a tissue, napkin or towel structure. The present invention allows for the high speed production of multi-ply product. This is achieved by the lamination of the two embossed webs of material using two dissimilar artistic patterns on the male embossing rolls where the bonding pattern is irregular.

Figure 1:
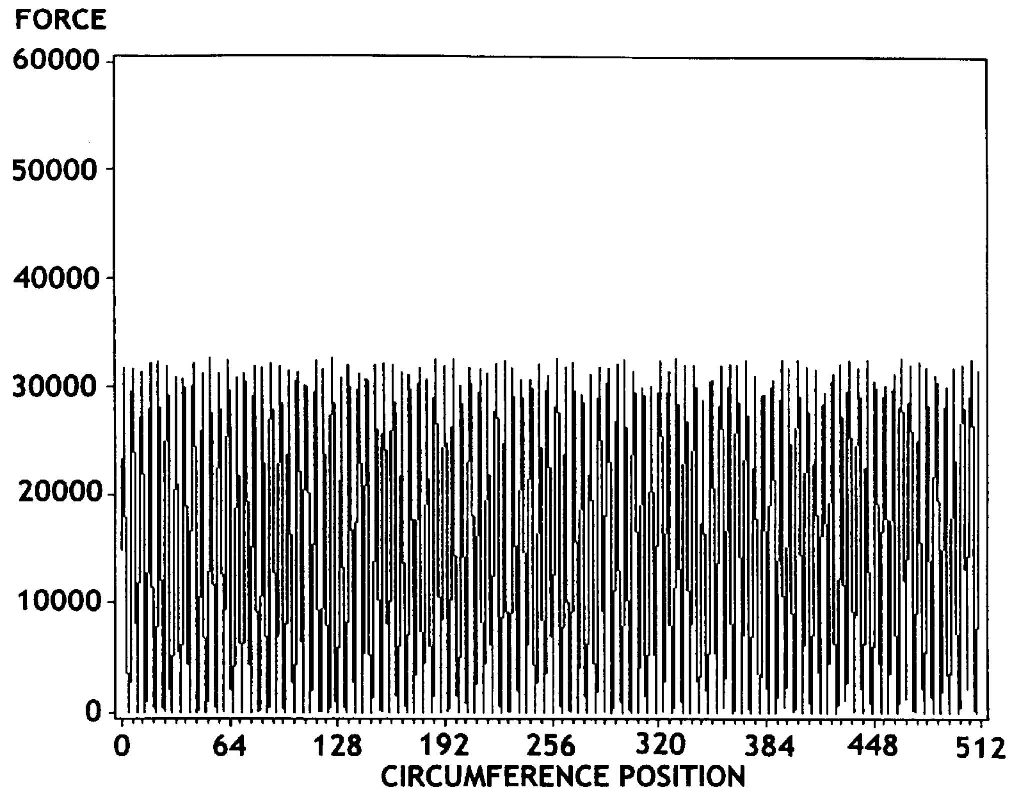
FIG. 1 is a plot of the forces produced in a traditional oval pin-to-pin laminating process.
Figure 2:
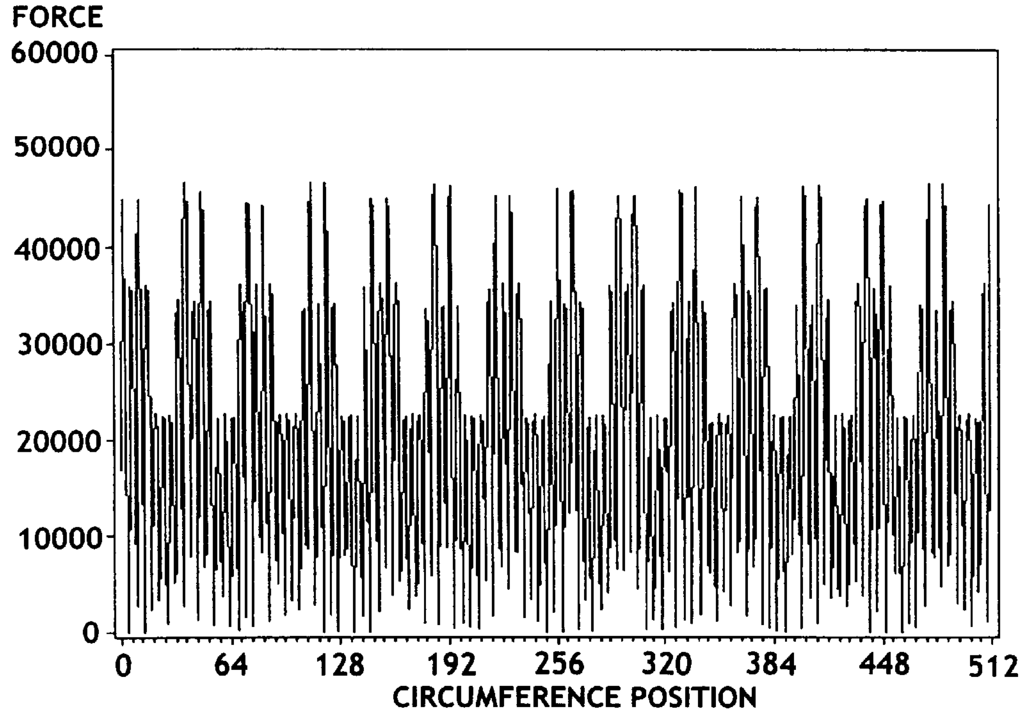
FIG. 2 is a plot of the forces produced in a pin-to-pin laminating process using the Ruppel pattern.
Figure 3:
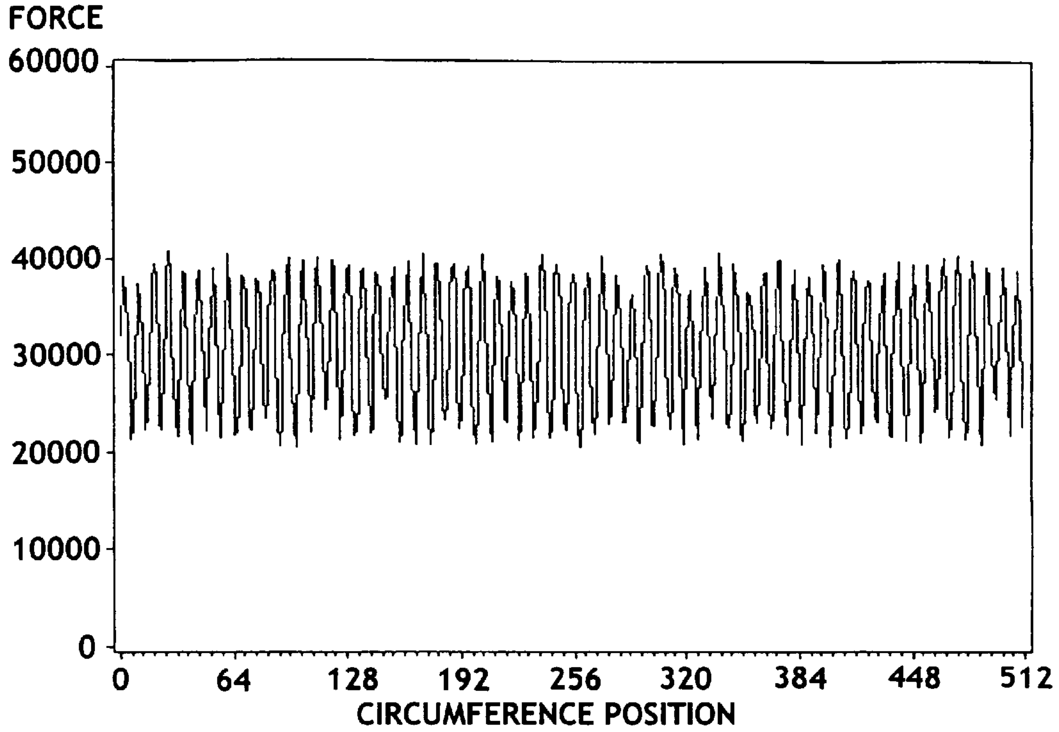
FIG. 3 is a plot of the forces produced in a pin-to-pin laminating process using the Floral Oval pattern.
Figure 4:
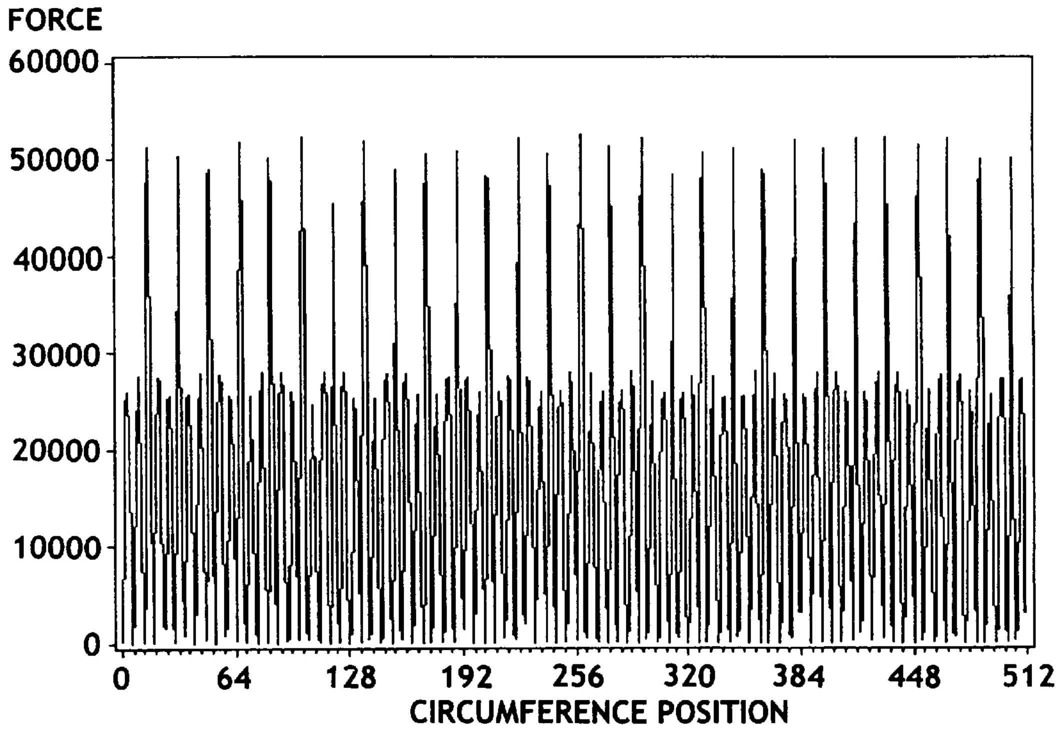
FIG. 4 is a plot of the forces produced in a pin-to-pin laminating process using the Sparkle pattern.
Figure 7:
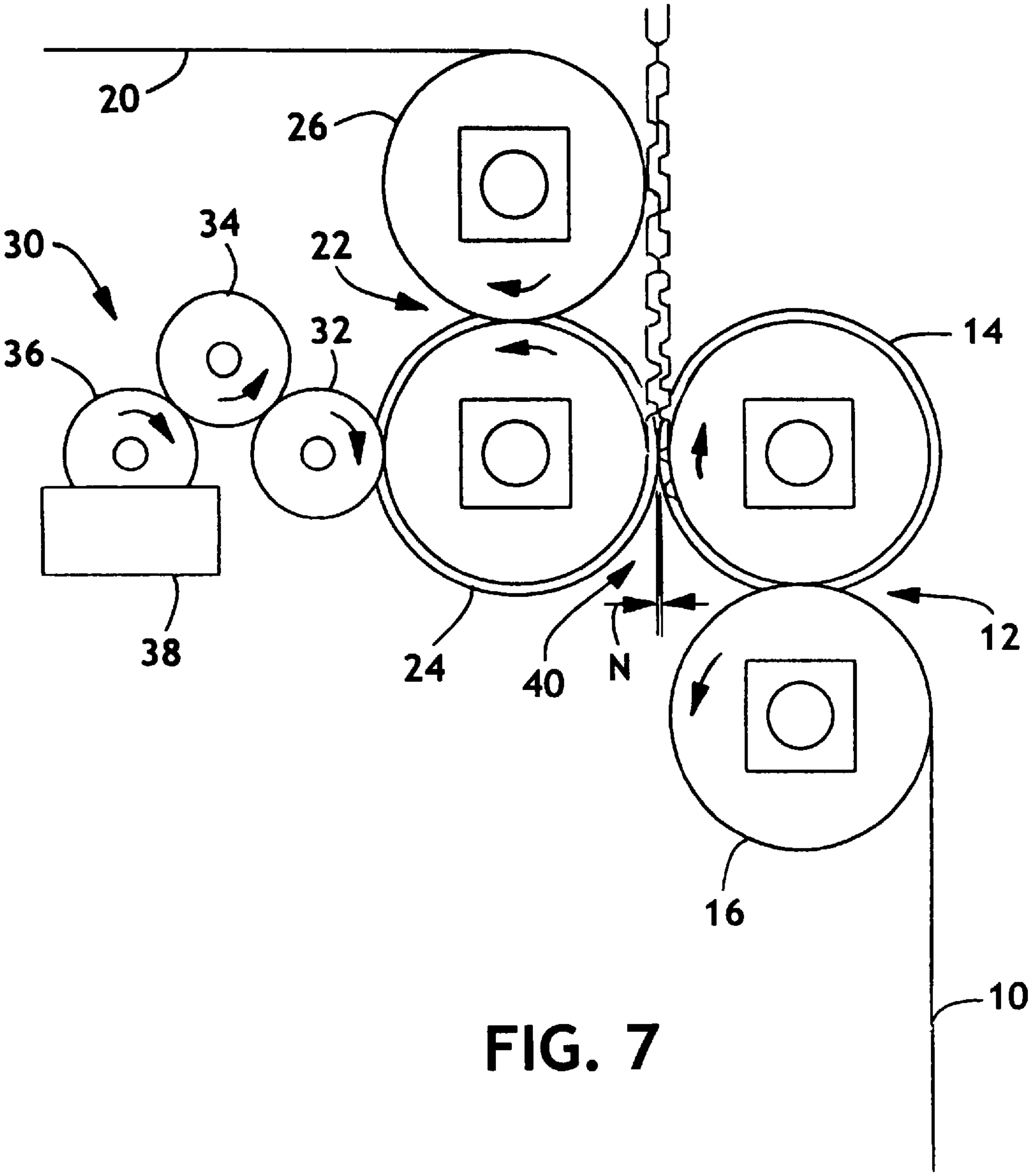
FIG. 7 is a schematic side view of the embossing and laminating method of the present invention.

Referring to the drawings, FIGS. 6 and 7 show the method of embossing and laminating of the present invention. A first web 10 is passed through nip 12 formed by the first embossing roll 14 and a first matched roll 16. The first embossing roll 14 is a metal roll having a male artistic pattern A machined or engraved onto the roll. The first matched roll 16 is a resilient rubber roll. The roll 16 has a durometer level of 55 on a Shore A scale and is typically operated with a nip pressure of 25 pli at nip 12 for a 20 lb. per ream sheet of tissue. As the web 10 passes through nip 12, the male artistic embossing elements press the artistic pattern A into the web and the first matched roll 16 causing upstanding embossments of pattern A which constitute a portion or fraction “a” of the total area of the sheet.

A second web 20 is passed through nip 22 formed by a second embossing roll 24 and a second matched roll 26. The second embossing roll 24 is a metal roll having a male artistic pattern B machined or engraved onto the roll. The second matched roll 26 is a resilient rubber roll. The roll 26 has a durometer level of 55 on a Shore A scale and is typically operated with a nip pressure of 25 pli at nip 22 for a 20 lb. per ream sheet of tissue. As the web 20 passes through nip 22, the male artistic embossing elements press the artistic pattern B into the web and the second matched roll 26 causing upstanding embossments of pattern B which constitute a portion or fraction “b” of the total area of the sheet.

Adhesive is applied to the high regions of the second web 20 by an adhesive applicator 30 consisting of an application roll 32, a metering roll 34, pick-up roll 36, and reservoir 38. The rolls of the applicator and embossing rolls rotate in the direction indicated by the arrows. This method of applying adhesive to a the upstanding embossments is generally known as “kiss coating” or transfer roll coating method.

The first and second webs combine at lamination nip 40 to form a laminate. The webs are bonded together when the two different artistic patterns of the two embossing rolls cross or meet in the nip. This area is referred to as the laminate interface. At this laminate interface, some of the protrusions of the first web attach to some of the protrusions of the second web to form a bonding pattern.

Adhesive is the preferred method of attachment. Other methods of attachment can be used as is well known in the art, including, but not limited to; thermal bonding, ultrasonic bonding, chemical bonding, water/hydrogen bonding, and mechanical bonding. Also, it is recognized that different types of adhesive can be used such as hot melt, natural, or synthetic.

The nip 40 is defined by nip gap N. Nip gap N is the adjustable distance between the high points or the intersecting artistic embossment patterns of rolls 14 and 24. The nip gap N is typically very narrow, such as between 0.005 and 0.0025 inches for two 20 lb. per ream tissue sheets. Preferably, the nip gap N is between 0.001 and 0.0015 inches. As webs 10 and 20 come together at the nip 40, a compressive force is generated at the nip since the two webs plus the adhesive are thicker than the nip gap N. The nip gap N is adjusted for the type of webs 10 and 20 being embossed and laminated; a larger nip gap N for heavier basis weight tissue sheets.

Figure 8:
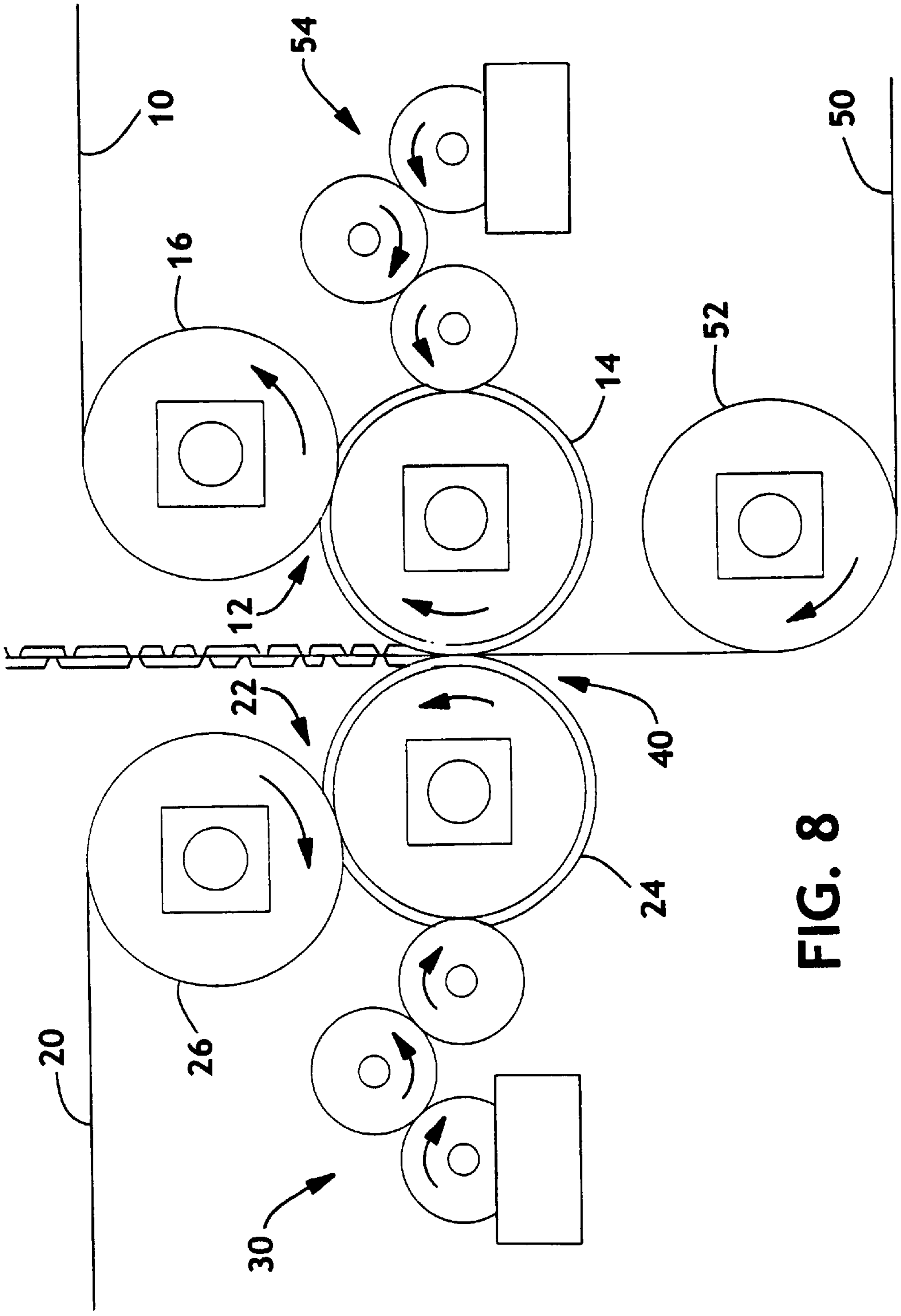
FIG. 8 is a schematic side view of an alternative embodiment of the embossing and laminating method of the present invention

FIG. 8 shows an alternative embodiment of the present invention. In this embodiment a third web 50 is combined between the first web 10 and second web 20. Third web 50 is guided by roll 52 into nip 40. As web 50 passes through web 40, the web 50 is combined with first web 10 and second web 20 such that the resulting laminate is a multi-ply web. In this embodiment, adhesive is also applied to the high regions of the first web 10 by an adhesive applicator 54.

Figure 23:
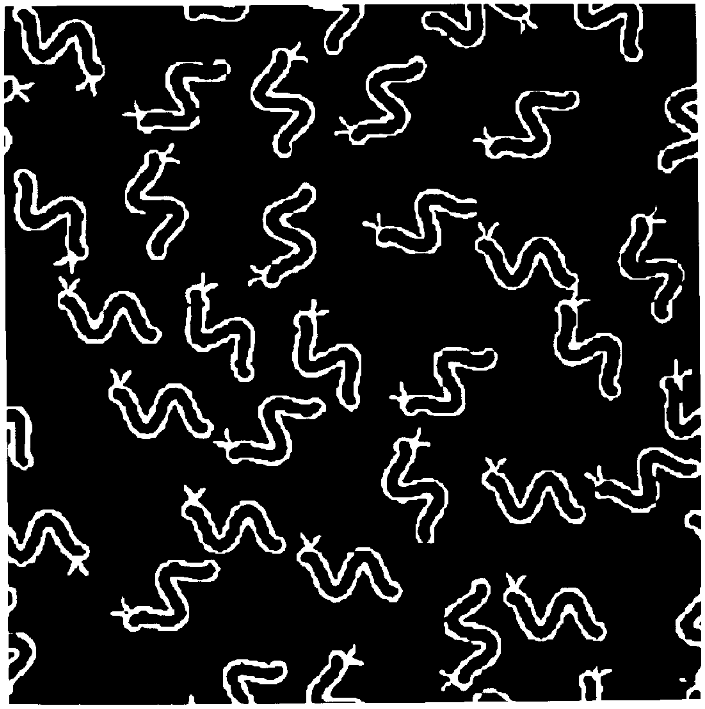
FIG. 23 shows the irregular worm pattern within the scope of the present invention.
Figure 24:
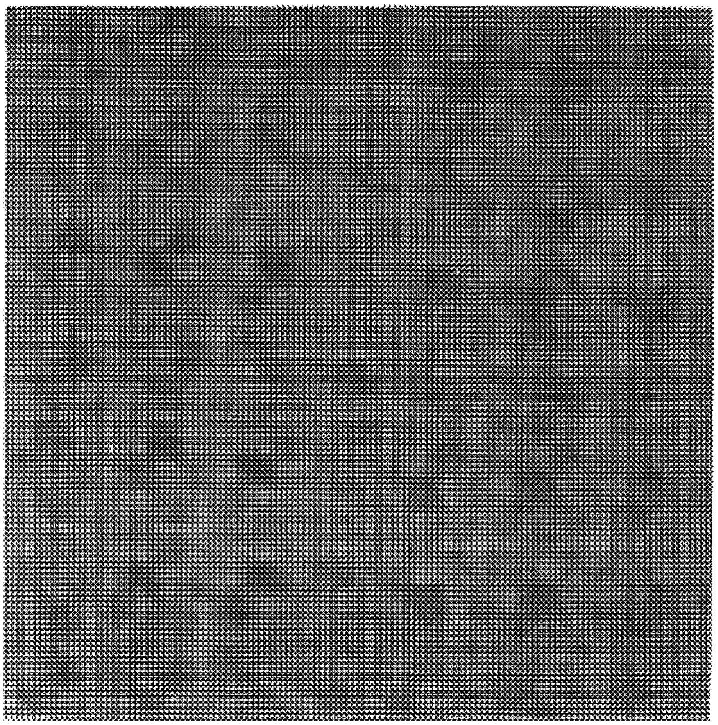
FIG. 24 shows a regular repeating pin pattern.
Figure 25:
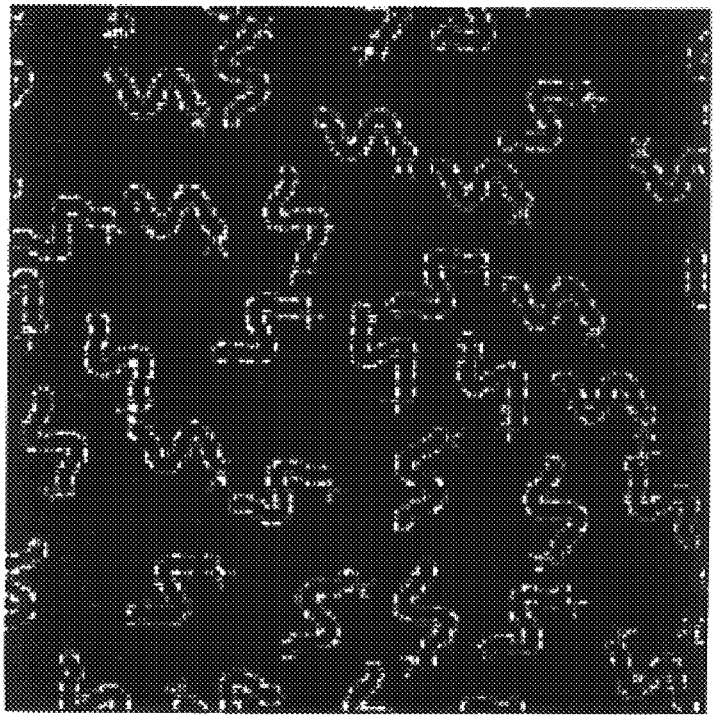
FIG. 25 is the irregular worm—pin bonding pattern produced by the patterns in FIG. 26 and FIG. 27.

The bonding points or areas are best seen by representing the artistic embossing pattern as a flat sheet. This is equivalent to flattening or rolling out the cylinder that has the artistic embossing pattern machined or engraved into the rolls. By overlaying the two artistic patterns of two rolls one can see the intersecting or overlapping areas which is the bonding pattern that will be generated in nip 40, e.g. FIG. 23 is embossing pattern A, FIG. 24 is embossing pattern B, and FIG. 25 is the bonding pattern.

While experimenting with pin-on-pin embossing and laminating of a towel product the final product was found to not be adequately bonded using two oval-pin artistic patterns for the two embossing rolls. After several unsuccessful adjustments it was believed that this was due to an rotational alignment problem of the two rolls at the laminating nip. Since the rolls were gear driven and there was some backlash in the gearing, further adjustment was deemed to not be useful. One embossing roll was removed and replaced with a different artistic pattern, floral oval. When using the two different rolls, adequate bonding was achieved. The machine speed was set at about 300 feet per minute of production due to past experience with this equipment. Since the production was running so quietly without vibration the production speed was increased. Surprisingly the lamination was unaffected. The production speed was progressively increased to more than double the normally expected operating speed. Further speed increase was limited by the particular drive motors used. The much higher operational speed with this configuration of embossing rolls was unexpected. In analyzing this operational condition it was found that the vibration induced by the original rolls, not misalignment, was the cause for the lack of sufficient bonding area. The desire to apply this learning to commercial production led to creating bonding patterns that would not induce vibration into the machinery near the machinery's resonate frequency.

The traditional approach to increasing the speed of the embossing and laminating equipment has been to make the equipment stiffer and more massive typically raising the resonate frequencies of the system. This is rather costly approach which does not lend itself to changing existing equipment. The present invention allows for a much more practical method for avoiding the deleterious vibrations of high speed laminating, with a low cost retro-fit of existing pin-on-pin embossing/laminating machines. Utilizing the principles of the present invention, the speed of the lamination nip is no longer a limiting factor in production. It is estimated that machine speeds of 8000 feet per minute can be obtained. Preferably, the machines speed is between 1000 to 4000 feet per minute.

The three features of the desired bonding pattern of this invention are: 1) The bonding pattern is the product of two different artistic embossing patterns; 2) The bonded area should range between 1% and 60% of the total area of the tissue, napkin or towel; and 3) The bonding pattern should be irregular at the laminate interface. By conforming to the first feature, precise alignment of the embossing rolls at the laminating nip is unnecessary. By conforming to the second feature, an adequate level of bonding can be achieved to give the sheet the integrity needed for a cellulosic tissue, napkin or towel product. By conforming to the third feature, the bonding or laminating will preclude speed limitations due to excitation of vibration at the resonate frequency of the machinery and rolls creating the laminating nip.

One can readily determine the bonded area. When the embossing patterns are dissimilar, this is a simple calculation. For example, if the first embossing roll has an irregular artistic pattern A that yields an embossed area of about 20% and the second embossing roll has a different regular artistic pattern B with about 50% embossing area, the resulting bonding pattern AB would have a high probability of generating about 10% bonded area (i.e., 50% of 20%). The bonding area can be observed from a finished embossed and laminated product, e.g., a paper napkin, or it can be mathematically established from the two artistic embossing patterns which are to be combined in the lamination. If the two patterns were the same or rather similar and the two embossing rolls misaligned in the bonding nip, then the simple calculation would fail and one must use a mathematical method.

At a minimum the bonded area is sufficient to hold the two webs together. The bonded area of the present invention is between 1% and 60% of the total area of the combined laminate. Preferably, the bonded area is between 10% and 50% of the total area of the combined laminate.

The present invention provides for a bonding pattern AB that has a very low likelihood of exciting the resonant frequency of the embossing and laminating equipment. Typical artistic patterns for an embossing and laminating system are the oval-pin design which creates an excitation force at the bonding nip with about a 161 hertz frequency when producing product at 1000 ft per minute. If there were no regularity to the bonding pattern of one revolution of the embossing rolls at the bonding nip, it would still repeat once every revolution. This regular force at a frequency of about 3 for 20 inch diameter rolls at 1000 fpm hertz is far different from 161 hertz and far less likely to cause "basket-balling" vibration. At 8000 feet per minute this would equal 24 hertz. This level of regularity can be further reduced by making the two male embossing rolls of different diameters such that the bonding pattern AB repeats only after 100 revolutions of the larger diameter roll (e.g., 21 inch diameter) and 105 revolutions of the smaller diameter roll (e.g., 20 inch diameter). This would lower the regular frequency of the force to about 0.03 hertz if needed. Irregularity is determined by mathematical and graphical methods.

Two mathematical and graphical methods are used to determine irregular patterns; Self-Similarity Count and Energy Suppression Factor.

The amount of irregularity in a pattern is defined by a measurement called the Self-Similarity Count that is based on a standard image processing approach known as autocorrelation. This measurement is implemented using the commercial image processing application IPLab for Macintosh Version 3.0 from Scanalytics, Inc. of Fairfax, Va.

First, the embossed bonding pattern of interest is determined as the proximal approach of the areas where the two embossing roll designs produce ply attachment. This design is then digitally represented as a black and white image. It consists of a N×N (where N is an even integer) array of picture elements or pixels that correspond to the design features of the embossed bonding pattern, specifically the bond positions which are the common points of contact (or close approach, since they are in reality separated by the laminating product under production) between the embossing roll protuberances. It is desired that the minimum resolution of the representation have at least 1 pixel, and preferably more than 1 pixel across the smallest feature of the bonding pattern design, and most preferably 4 pixels per mm. It is also desired that the highest value (255 for example with 8 bit pixels) in the image (represented as either white or black) correspond to the bonded areas, unless the fractional area of the sum of the bonding areas relative to the unbonded areas is greater than 1, in which case they should be represented by zero and the unraised area represented by the highest value. A selected square section of the image of size from the dimensions of the entire pattern down to 4 inches by 4 inches is placed in the center of a 2N×2N field of zero values having 4-times larger area. This "zero-padded" image is then converted to "floating-point" numbers (decimal) and subjected to a mathematical transform known as an auto-correlation that measures where in the image the underlying design is similar to itself.

The auto-correlation is the mathematical operation specifying the degree of similarity or variation in a image (or signal) between one position and some other. It is calculated by taking an image, and overlaying an exact duplicate of that image translated by some offset in the horizontal and/or vertical direction. Starting with no translation between the images (that is with exact overlap), the pixel values at each discrete location within the images are multiplied and the results are summed over all overlapping pixels to yield a single value for this relative position between images. This procedure is repeated for all possible overlap possibilities, that is, for all possible translations of one pattern relative to the other, to yield a two-dimensional auto-correlation function. As in the standard image processing definition, we define the auto-correlation function of a real-valued 2N×2N-size image to be represented mathematically by an expression of the form:

$$\text{Auto-correlation}(x, y) = \sum_{i=-N}^{N-1} \sum_{j=-N}^{N-1} \text{Image}(i, j) \cdot \text{Image}(i + x, j + y)$$

where the variables x and y represent the horizontal and vertical translation (offset) between the image and its duplicate. See for example: R. C. Gonzalez and R. E. Woods, Digital Image Processing, Addison-Wesley Publishing Co., 1992.

Figure 9:
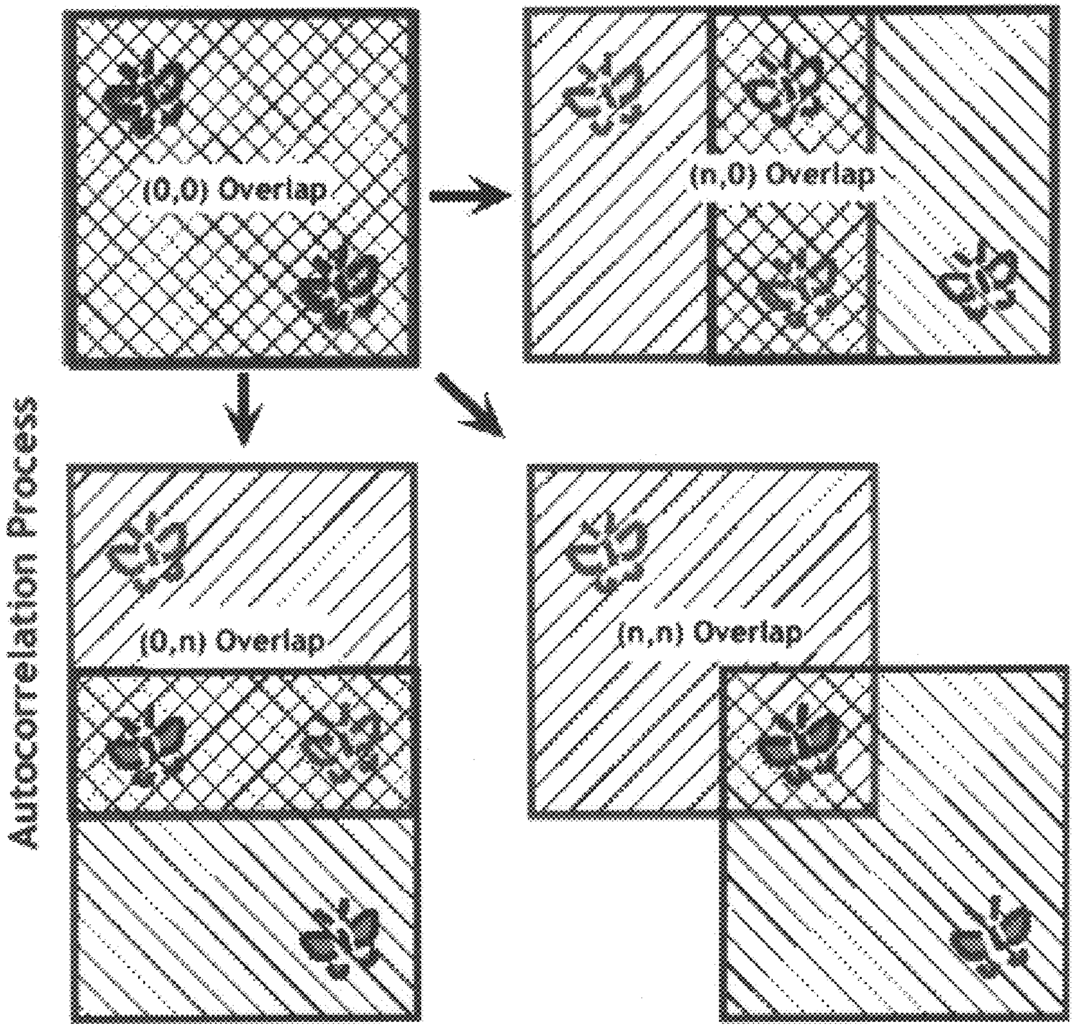
FIG. 9 is an illustrative design of two butterfly patterns showing the auto-correlation process.
Figure 10:
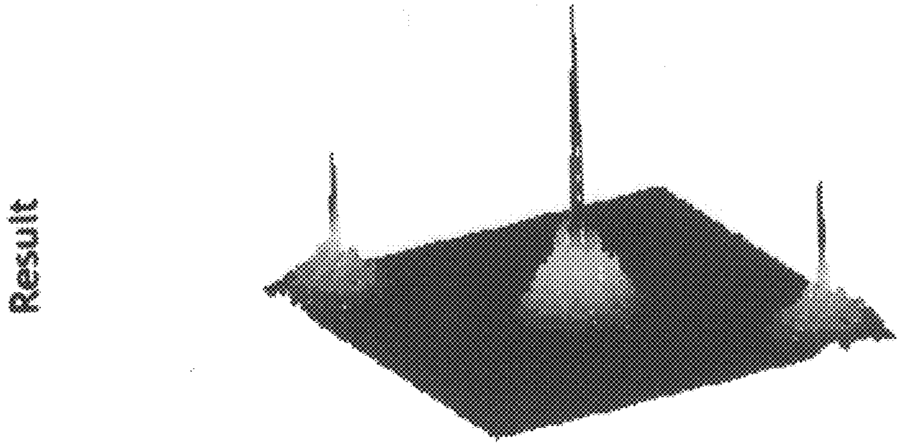
FIG. 10 is an auto-correlation plot of the illustrative design of FIG. 9.

It is instructive to visualize the process graphically as shown using the illustrative design of FIG. 9. This simple design, made only for illustrative purposes of how the auto-correlation is calculated, consists of two butterfly patterns diagonally placed in a background of zeros. The original and duplicate image are shown completely overlapped in the upper left corner of the figure, as shown by the cross-hatched area covering the entire image. The values of the images at each pixel position are multiplied by each other and all these products are summed up to yield one point of the auto-correlation result, specifically the point at the (0,0) or center position. Since the entire image exactly overlaps, the auto-correlation result at this position will be a maximum. This process is repeated for all horizontal and vertical translations to yield an array of data corresponding to all possible positions of offset as shown in FIG. 10. Note that only three other positions of offset are shown in FIG. 10, and only one of these, the one in the middle right, has a non-zero contribution because one of the butterfly patterns in the duplicate overlaps the other in the original image. This corresponds to the smaller peak to the right of the central large peak. The smaller peak to the left of the central peak is due to an offset in the opposite direction that is not shown. Also note that there is some structure to the peaks before they reach a maximum. This is due to various degrees of overlap of the individual butterfly patterns as they get closer and closer to exact coincidence.

With the zero-padded image, there is a natural tendency for the result to drop off as one moves away from the central peak because there is a decreased area of nonzero-valued image overlap. To account for this decreased sensitivity of the transform away from the center, a modification to this auto-correlation result is incorporated. Specifically, the N×N center section of the 2N×2N auto-correlation result is extracted and multiplied by another N×N image that we will call a "gain map".

The gain map is itself calculated using the cross-correlation of a N×N block of constant height (=1.0) with the original design image (where both have been embedded in a 2N×2N array of zeros). A cross-correlation is a generalization of the auto-correlation, except two different images are used rather than one and its duplicate. Mathematically, the cross-correlation between two images is represented by an expression of the form:

$$\text{Cross-correlation}(x, y) = \sum_{i=-N}^{N-1} \sum_{j=-N}^{N-1} \text{Image1}(i, j) \cdot \text{Image2}(i + x, j + y)$$

where the variables x and y represent the horizontal and vertical translation (offset) between the two images. Because of the symmetric nature of the final gain map, the unit block can be either Image1 or Image2 in the above expression. After the calculation of the cross-correlation of the unit block and the image to be analyzed, the N×N center section is extracted from the 2N×2N cross-correlation result image. The values of this center section are now normalized to have a maximum value of 1 by dividing each of the values in this center section by the maximum value in this extracted section. The values of this normalized N×N center section are then inverted (yielding a minimum value of 1), and the inverted values are limited to a maximum value of 8. This limit has been chosen so that the gain map does not become too large and exaggerate features in the corners of the auto-correlation that are not really important. Finally, the resulting image is modified to have reflection symmetry about it's center by the following procedure. A second, duplicate version of the image is created and rotated by 180 degrees about its center. The two images are then combined into a final gain map by taking the maximum values at each of the corresponding N×N points in the two images. This gain-map procedure is a conservative approach that increases the peak heights in the results and therefore, tends to err the results on the side of describing a pattern as more regular than it might actually be.

The number of peaks above a specified threshold level in this scaled, auto-correlated image is called the "Self-Similarity Count" and is used as the measure of design regularity or irregularity. Each of these peaks beyond the first will effectively correspond to repeating features of the pattern. The threshold level is defined as $$\text{Threshold} = \frac{1}{2}(\text{Max Peak Height} + \text{Mean Height})$$

This is approximately halfway between the mean background level of the result and the highest peak which represents complete pattern matching. For images with repetitive patterns, there will be multiple peaks in the scaled auto-correlation image. Each peak corresponds to the repeating features of the pattern. The number of peaks remaining after thresholding is known as the Self-Similarity Count.

An irregular design pattern according to the present invention has only one peak above the threshold which results in a Self-Similarity Count of 1. Any pattern with sufficient regularity will have multiple peaks above the threshold and will have a Self-Similarity Count greater than 1. Design patterns that are tested with this Self-Similarity Count method on any square sample of size down to 4 inches by 4 inches and exhibit a Self-Similarity Count of 1 are sufficiently irregular to reduce vibrations within the machinery and allow increased machine speed.

Figure 11:
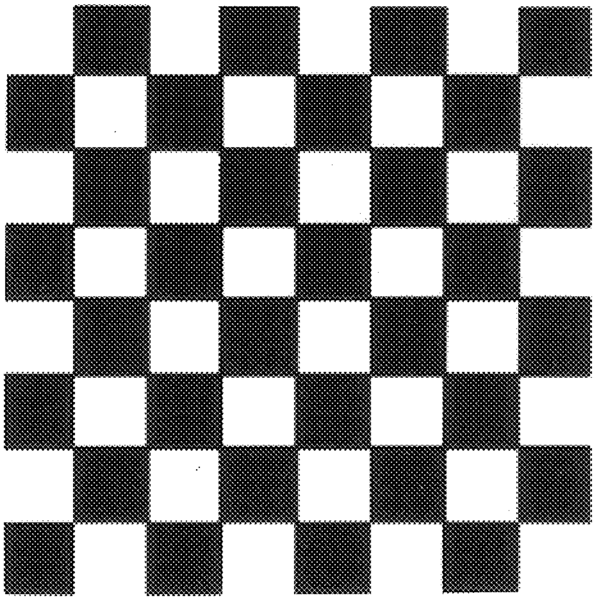
FIG. 11 is a checkerboard embossing pattern that is not within the scope of the present invention.
Figure 12:
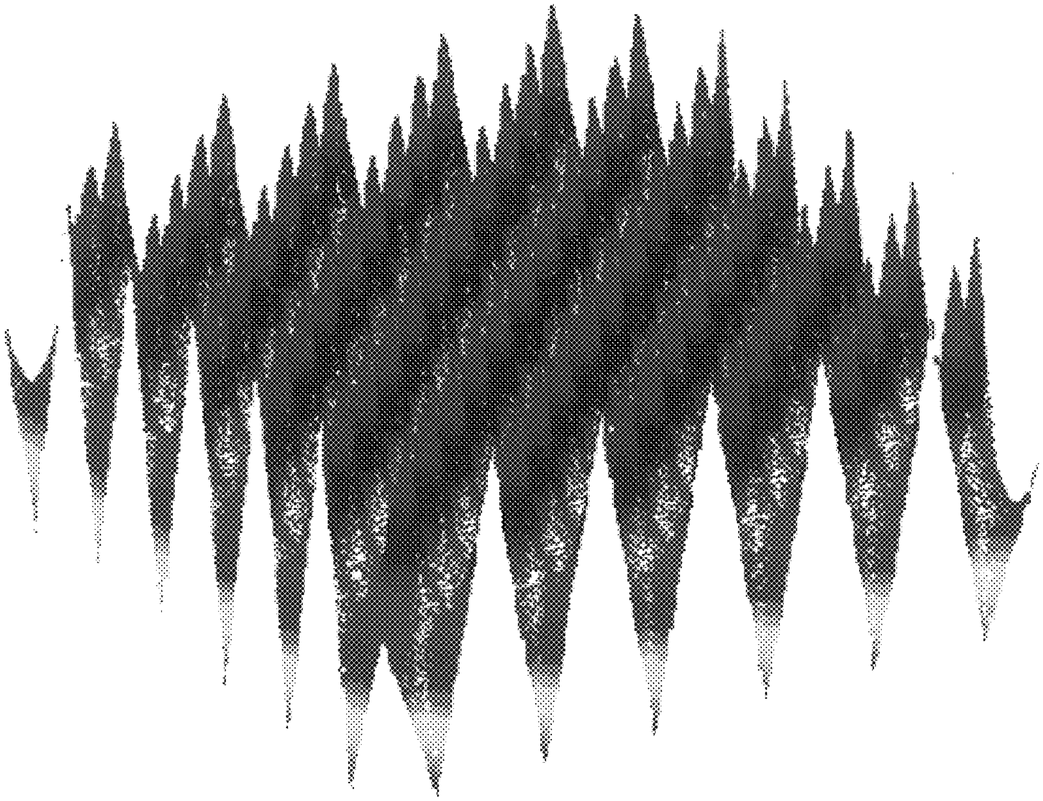
FIG. 12 is a self-similarity plot of the pattern of FIG. 11.
Figure 13:
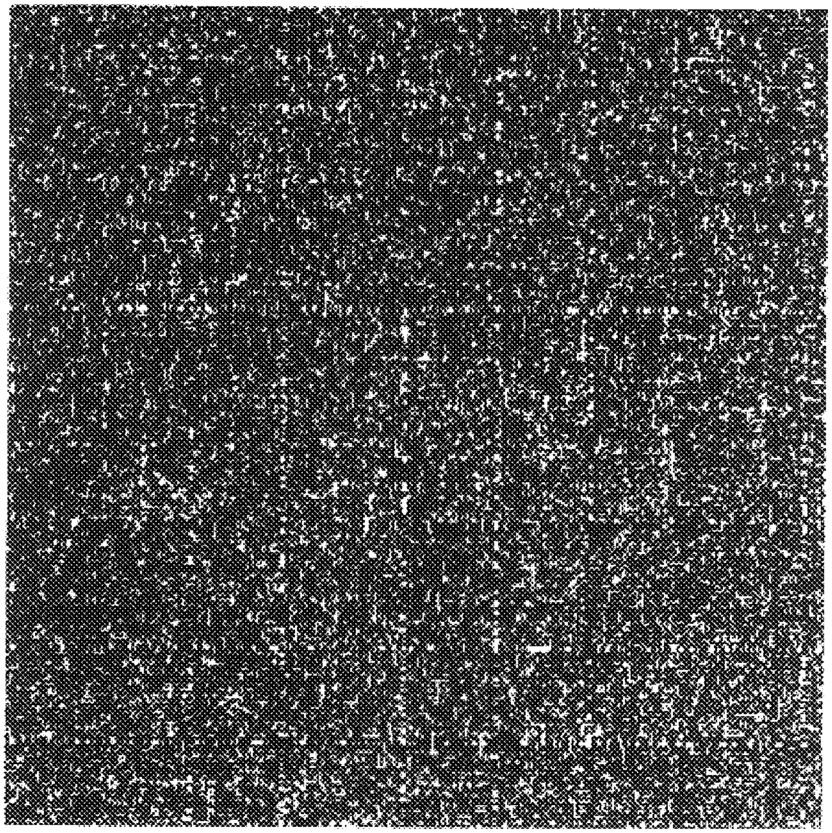
FIG. 13 is computer-generated random noise.
Figure 14:
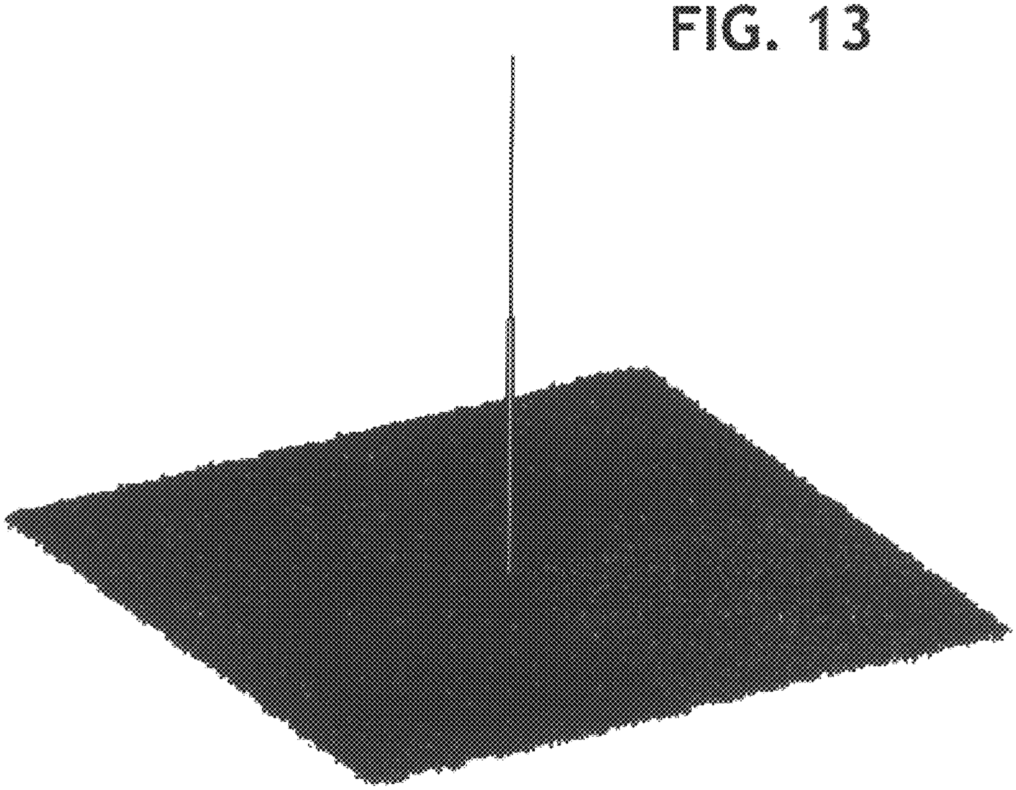
FIG. 14 is a self-similarity plot of the pattern of FIG. 13.

Several examples are included here for illustration of this classification technique. FIG. 11 shows a regular "checkerboard" pattern of square bonding areas (shown in white) of total size 512 by 512 pixels. FIG. 12 shows the self-similarity plot (auto-correlation and gain-map scaling) of this design, yielding a series of peaks corresponding to positions where the white regions overlap each other to a maximal extent. This would be an example of a design with a very high degree of regularity and, in fact, yields multiple peaks after thresholding. FIG. 13 shows computer generated random noise. FIG. 14 shows the self-similarity plot of FIG. 13, resulting in only a single peak (which is above the threshold value) and a Self-Similarity Count of 1 as expected.

Figure 15A:
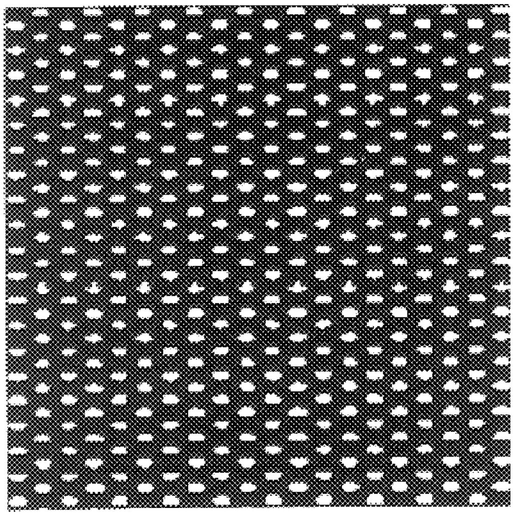
FIGS. 15*a–c* shows the Ruppel embossing pattern that is not within the scope of the present invention.
Figure 15B:
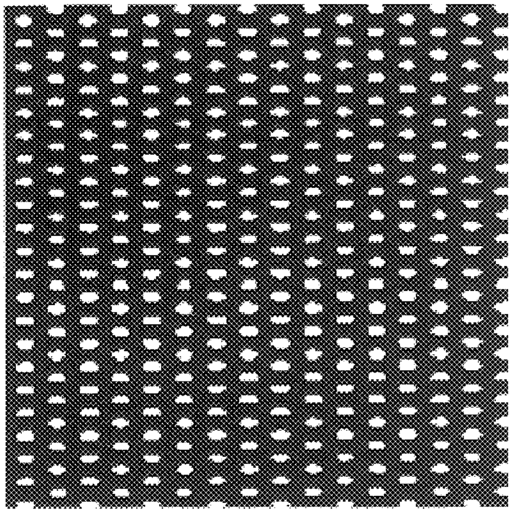
Figure 15C:
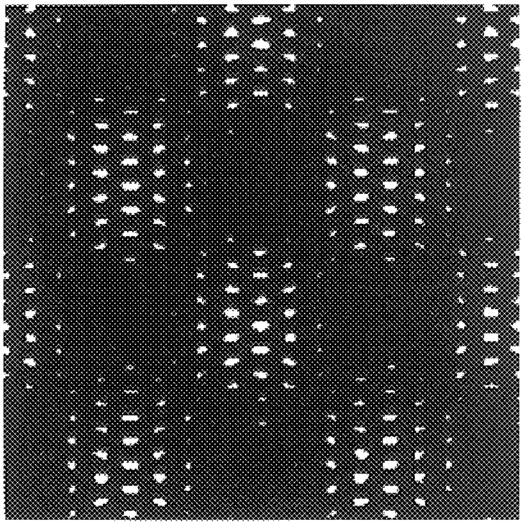
Figure 16:
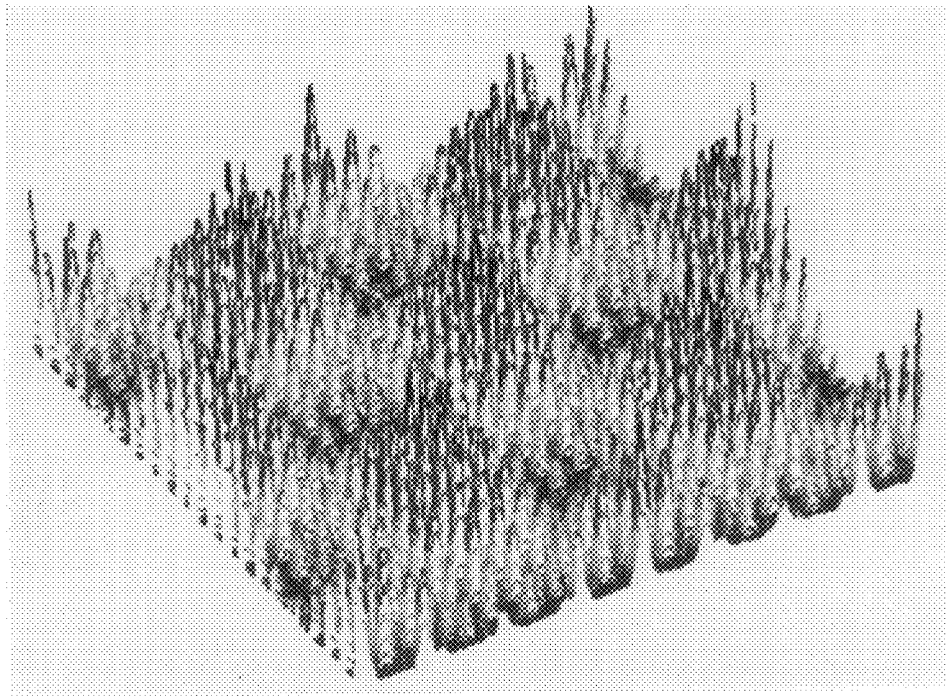
FIG. 16 is a self-similarity plot of the pattern of FIG. 15*c*.
Figure 17:
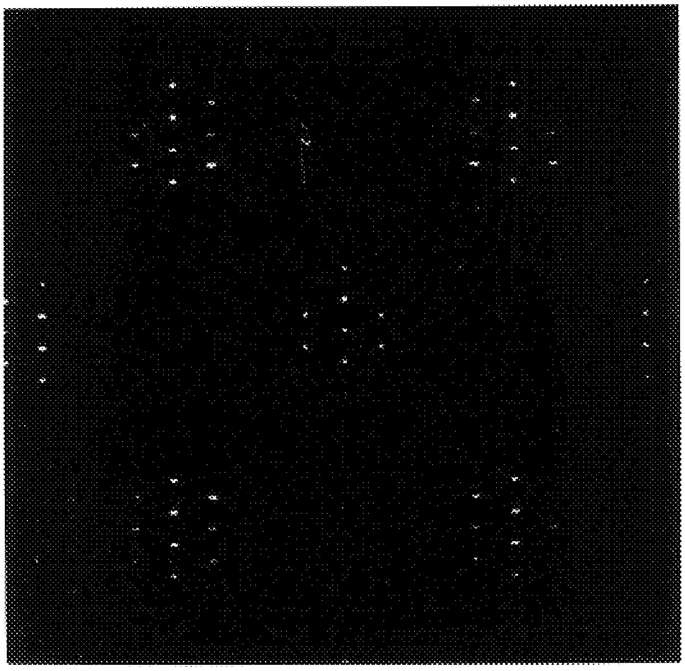
FIG. 17 is the threshold plot of the pattern of FIG. 15*c*.

FIG. 15 shows another prior art design that is outside the scope of the present invention. It is described in U.S. Pat. No. 5,173,351 to Ruppel. The design is actually an interference pattern (15*c*) that is formed from two embossing rolls (15*a* and 15*b*) of regularly-spaced protuberances. FIG. 16 illustrates the multitude of peaks that result from applying self-similarity and FIG. 17 is the threshold plot showing a high Self-Similarity Count.

Figure 18:
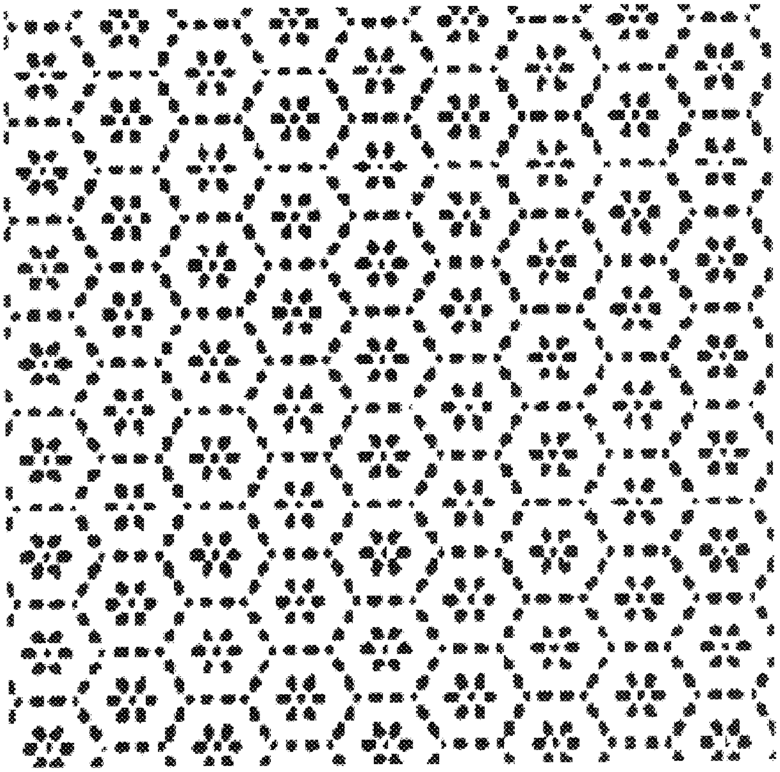
FIG. 18 shows the Sparkle embossing pattern that is not within the scope of the present invention.
Figure 19:
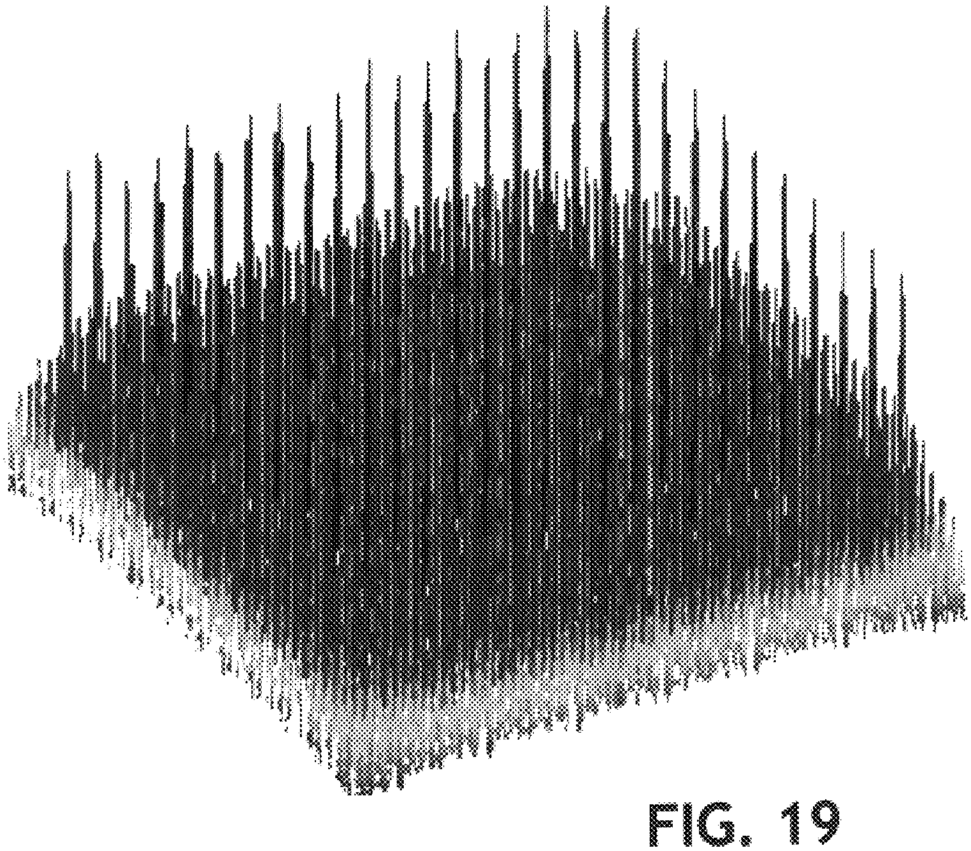
FIG. 19 is a self-similarity plot of the pattern of FIG. 18.

An embossing pattern design commercially known as Sparkle™ is shown in FIG. 18. This is an example of a design with a very high degree of regularity and the presence of a multitude of peaks is apparent in FIG. 19.

Figure 20:
FIG. 20 shows the irregular butterfly pattern within the scope of the present invention.

FIG. 20 shows an embossing pattern that is within the scope of the present invention. As can be seen, the butterfly detail is the same, but the butterflies are unevenly spaced. There is no relationship between the spaces between each embossing element. That is, the butterflies are irregularly positioned.

Figure 21:
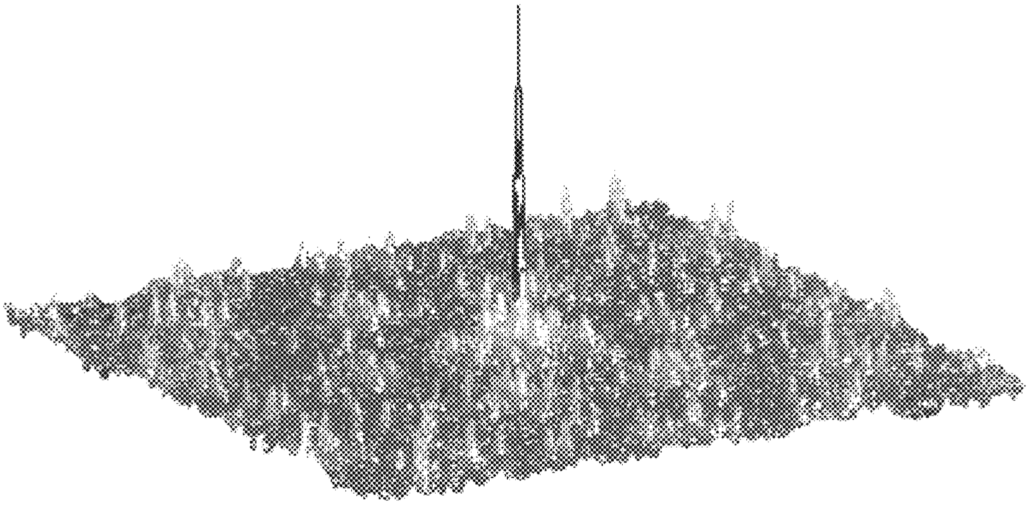
FIG. 21 is a self-similarity plot of the pattern of FIG. 20 within the scope of the present invention.
Figure 22:
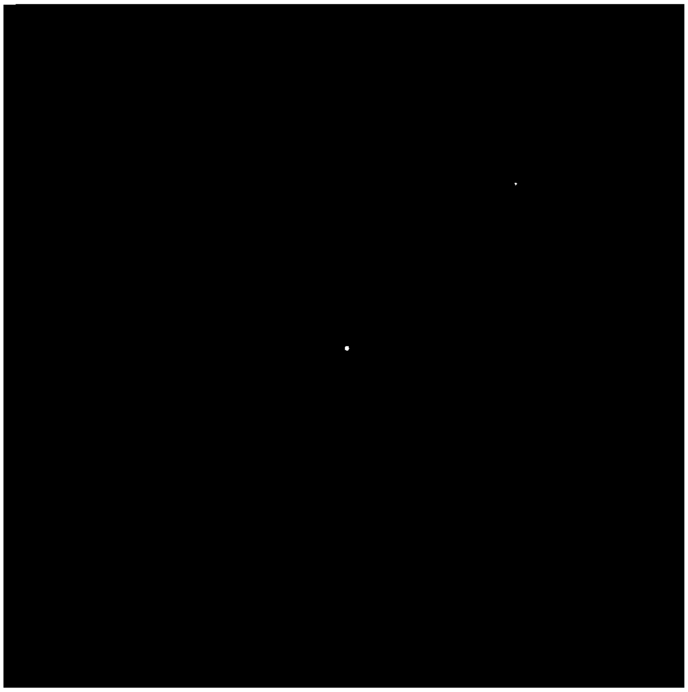
FIG. 22 is the threshold plot of the pattern of FIG. 20.

FIG. 21 is a self-similarity plot of the irregular butterfly pattern of FIG. 20. The results yield only one major peak, and it becomes the only one present after thresholding. FIG. 22 shows the threshold plot where only one peak is seen in the center of the image. This pattern, therefore, has a Self-Similarity Count of 1.

Figure 26:
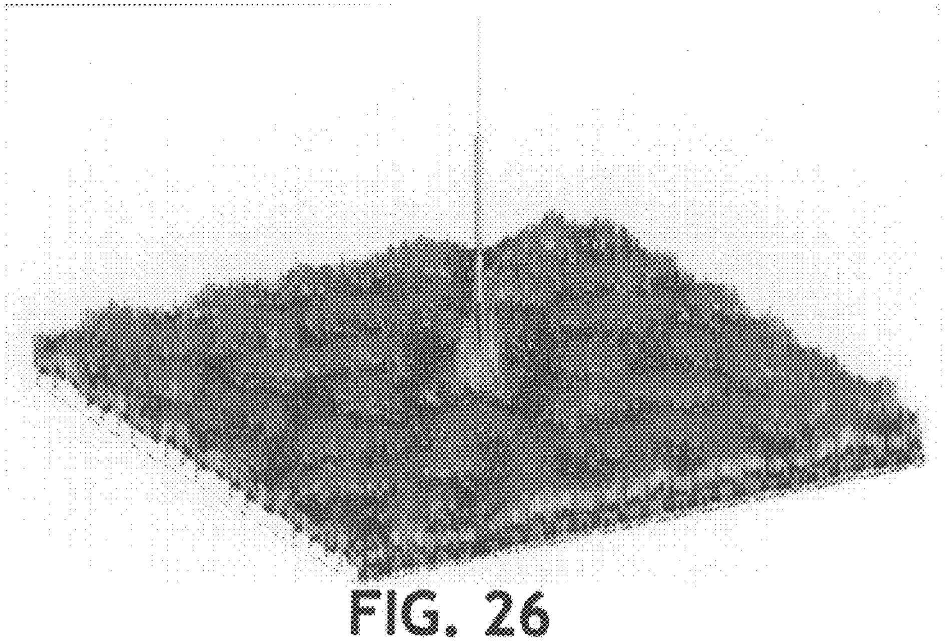
FIG. 26 is a self-similarity plot of the pattern of FIG. 28.
Figure 27:
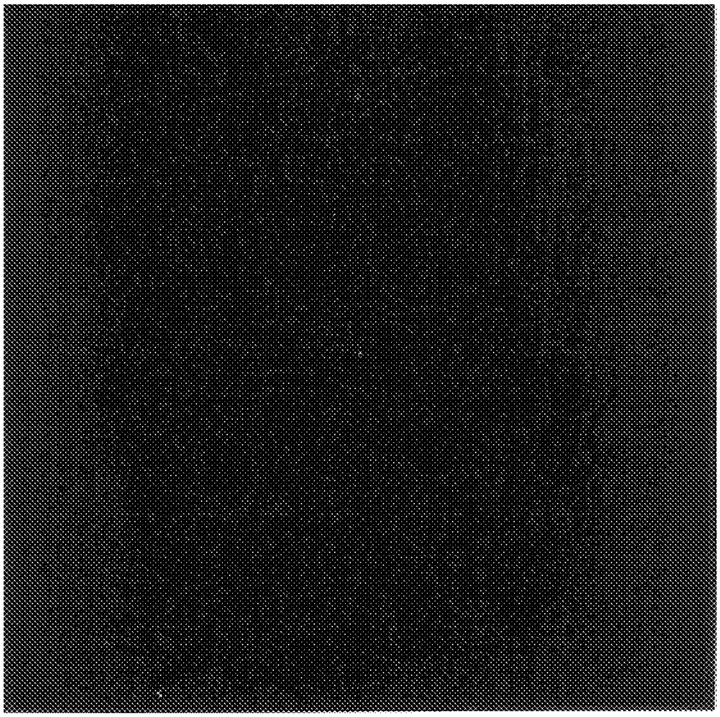
FIG. 27 is the threshold plot of the pattern of FIG. 28.

FIG. 23 shows an irregular worm pattern (12% web coverage) that when combined with the regular pin pattern (25% web coverage) of FIG. 24, produces the irregular bonding pattern (3% web coverage) of FIG. 25. FIG. 25 shows the individual bonding points that occurs at the lamination nip. FIG. 26 is a self-similarity plot of irregular worm-pin bonding pattern of FIG. 25. FIG. 27 is the threshold plot of the bonding pattern showing a Self-Similarity Count of 1 due to the single peak in the center of the figure. As such, this bonding pattern is within the scope of the present invention.

The Energy Suppression Factor (ESF) method is another method to determine whether a bonding pattern has the prescribed irregularity to reduce vibrations within the machinery and allow increased machine speed and thus within the scope of the present invention.

The ESF method is an image analysis method to characterize the degree of regularity of embossing roll patterns possessing discrete, non-continuous objects and used during the production of two-ply, paper products. This method employs the concepts of 'marching frames' across a pattern and rotation of the pattern image. The percentage of embossed or bond area present in each of the thin (2-pixel), marching frames is measured, which simulates the region where the embossing or laminating rolls meet (i.e., the nip), as the frame moves systematically across the pattern. The accumulation of marching frame data (percent bond area/frame) and statistics are performed at different rotation angles (0–175 degrees) of the image. After accumulation of data across 36 evenly spaced rotations (5 degrees per rotation), the percentage of bond area is normalized by calculating the percent coefficient-of-variation (% COV) of 114 measurements at each rotation angle. % COV values can also be plotted versus 36 rotation angle points. A highly irregular pattern will produce a very 'flat' plot, while a pattern possessing significant regularity will produce a plot with at least one or more 'spikes.' Numerically, a pattern's degree of regularity can be measured and normalized for percent bond coverage by taking the % COV of the % COVs obtained across all 36 rotation angles. The resulting number is the Energy Suppression Factor. As an example, an irregular pattern consisting of random noise yields an ESF of 8%, while a highly regular checkerboard pattern yields a value of 66%.

The ESF method is performed as follows. First, pattern characterization is performed using a Quantimet 600 IA System (Leica, Inc., Cambridge, UK) which possesses image processing software (QWIN Version 1.06) that allows image rotation and percent area measurements to be performed. Pattern images are read directly into the Quantimet 600 in tagged image file format (TIFF).

The pattern images are converted from 10"×10" originals into a 720×720 pixel format. During the characterization, the 720×720 pixel renditions are cropped down to 512×512 pixels (7.1"×7.1"). The pattern images are binary in nature. The 'background' of the embossing pattern (non-raised region) is either black or white, while the 'raised' pattern region is the opposite of the background (e.g., Background in white, and pattern in black).

Figure 28:
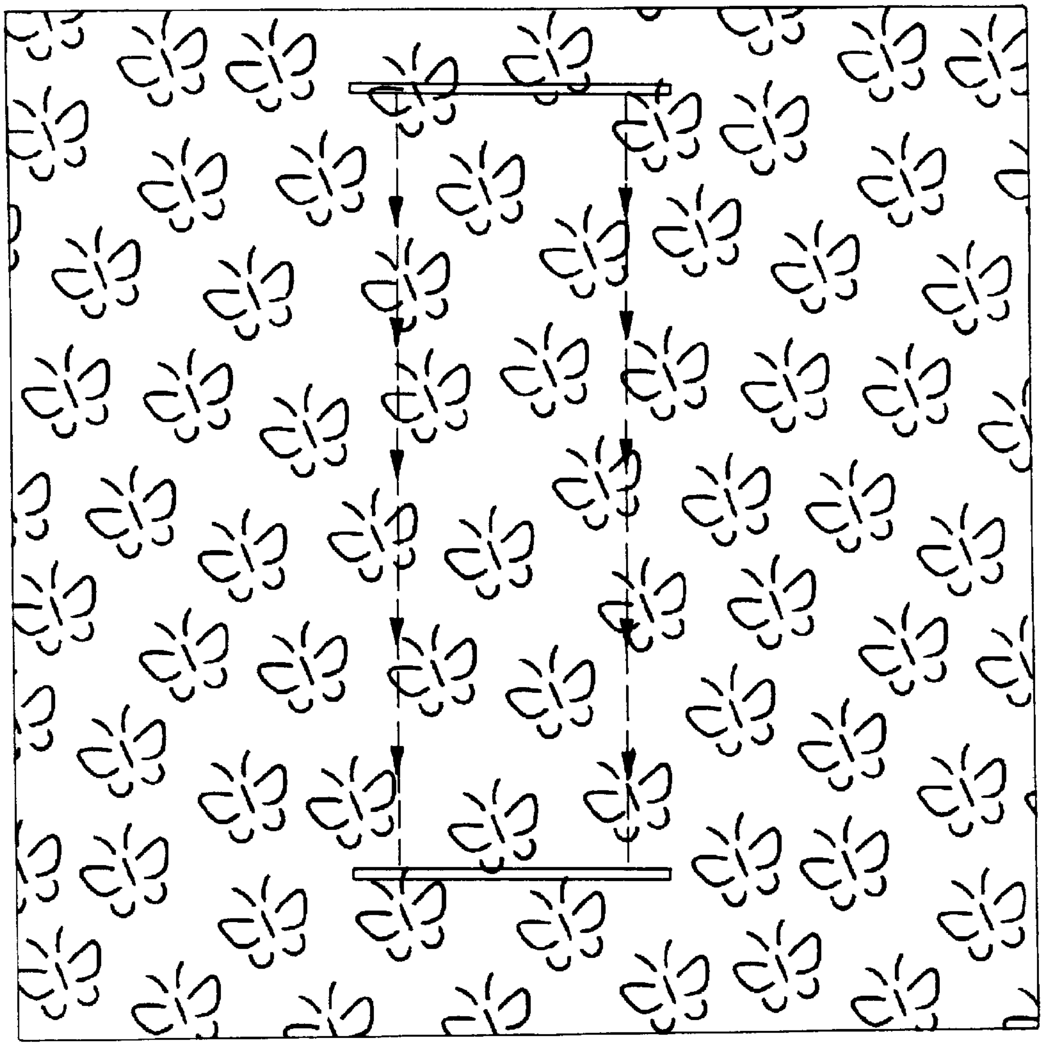
FIG. 28 shows the procedure for testing patterns using the Energy Suppression Factor method.
Figure 29:
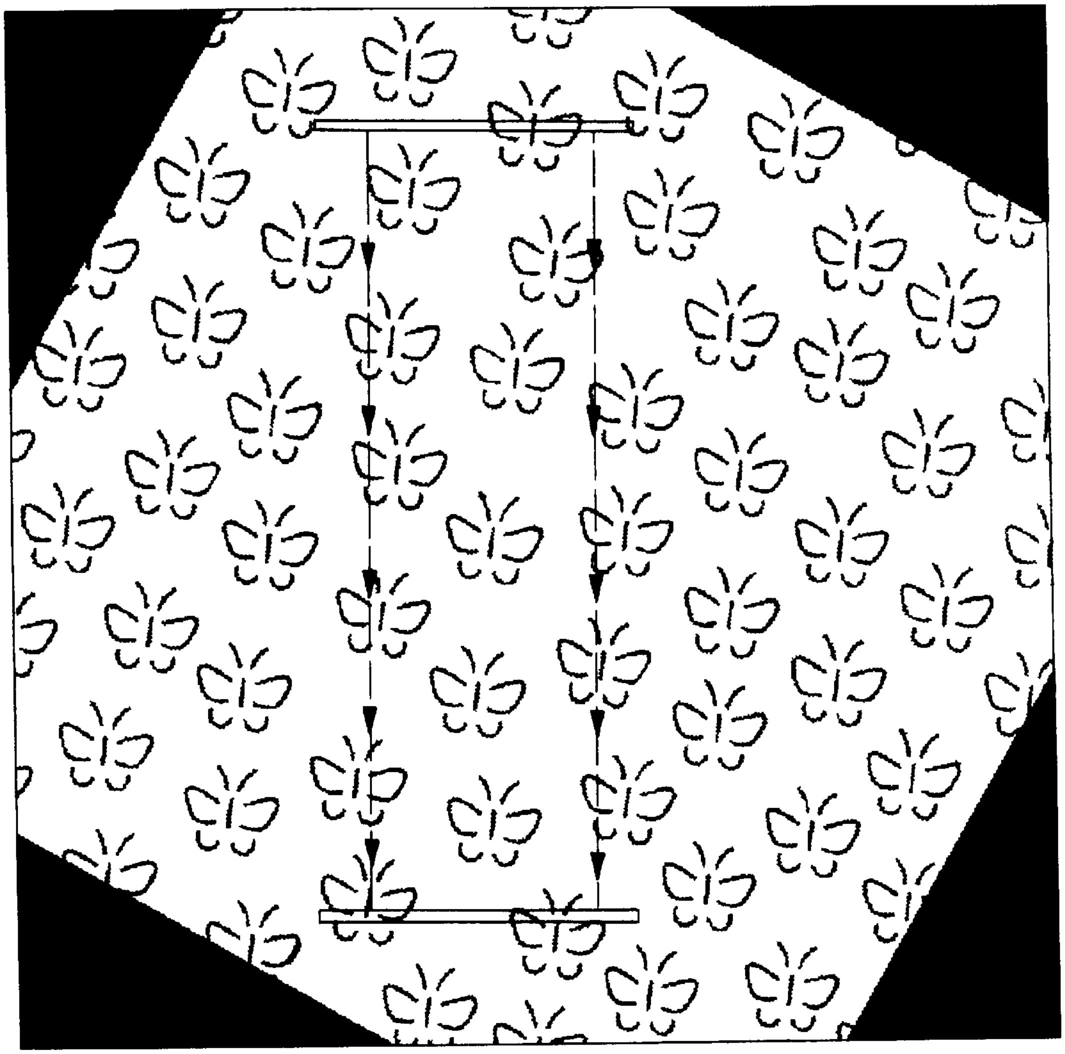
FIG. 29 shows the rotation procedure for testing patterns using the Energy Suppression Factor method.

For the analysis, the interior of the marching frame, in which percent pattern area is measured, is 210×2 pixels (2.91"×0.028"). The 'width' of the marching frame (210 pixels) fits within the longest rectangle, vertically, that can fit onto the image while accounting for image cropping that occurs during image rotation. The longest, vertical, rectangular fit is used to simulate the way in which the maximum length of the pattern moves along the embossing roll through the nip. The 'height' of the frame is 2 pixels and provides a reasonable minimum that simulates the nip for which vibration might be the worst. FIG. 28 illustrates how one hundred fourteen frame measurements are made on adjacent fields-of-view as the frame 'marches' down a representative pattern image from top to bottom. FIG. 29 illustrates how frame measurements are made on the image after it is rotated 30 degrees. The analysis region covers 18.6 $in^2$(2.91"×6.36") of the 7.1"×7.1" pattern image resulting in one-half of the pixels not sampled because the marching frame moves down at four pixel increments. Alternatively, one could measure all pixels within the analysis region by marching the frame two pixels at a time (228 frame measurements). For a 512×512 pixel image, the analysis region will cover 47,880 pixels or 18.4% of the image. Assuming that a minimum pattern element would be 1 mm, the element would be represented by 2.8 pixels in a 7.1"×7.1" image. This 2.8 pixel element resolution would be considered the minimum for the overall image being analyzed, and the analysis region would include multiple, discrete, non-continuous objects. As an alternative to the 512×512 pixel image format, a larger image rendition could be analyzed (e.g., 10"×10") using a larger pixel image format (e.g., 720×720 pixels). The appropriate sizing modifications could also be made on the marching frame as well (e.g., 295×3 pixels).

Figure 30A:
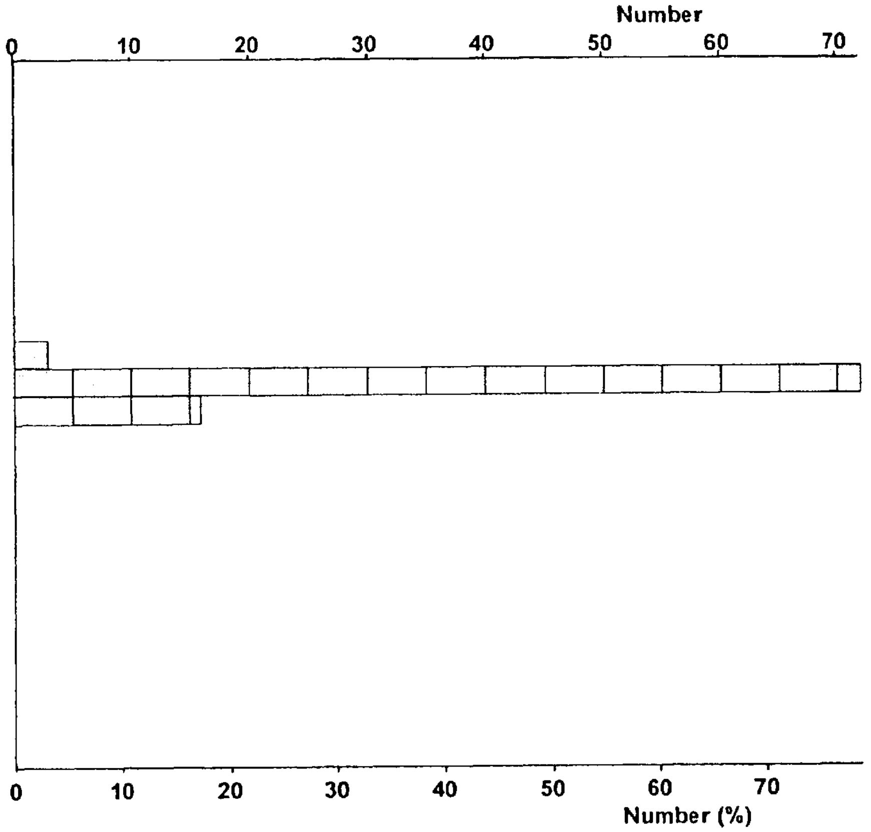
FIG. 30 shows representative data from the Energy Suppression Factor method.
Figure 30B:
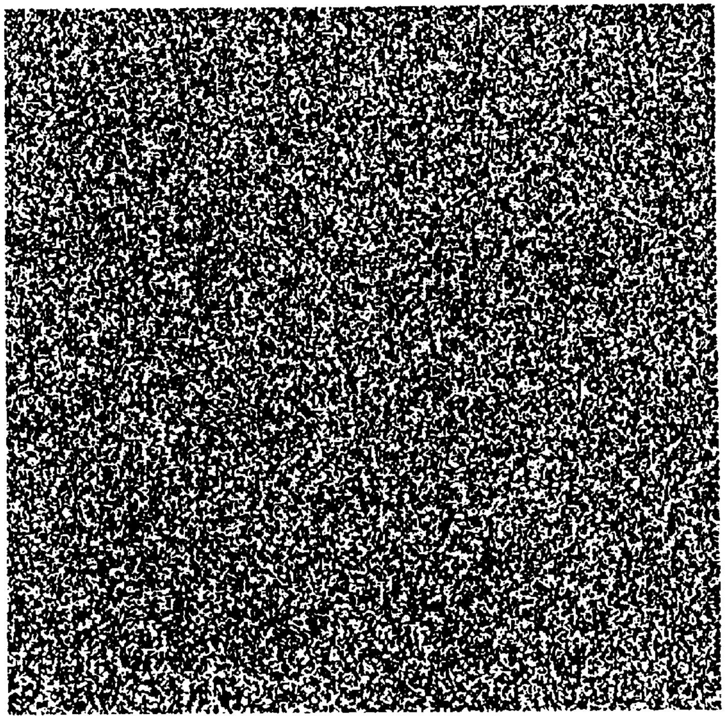
Figure 32A:
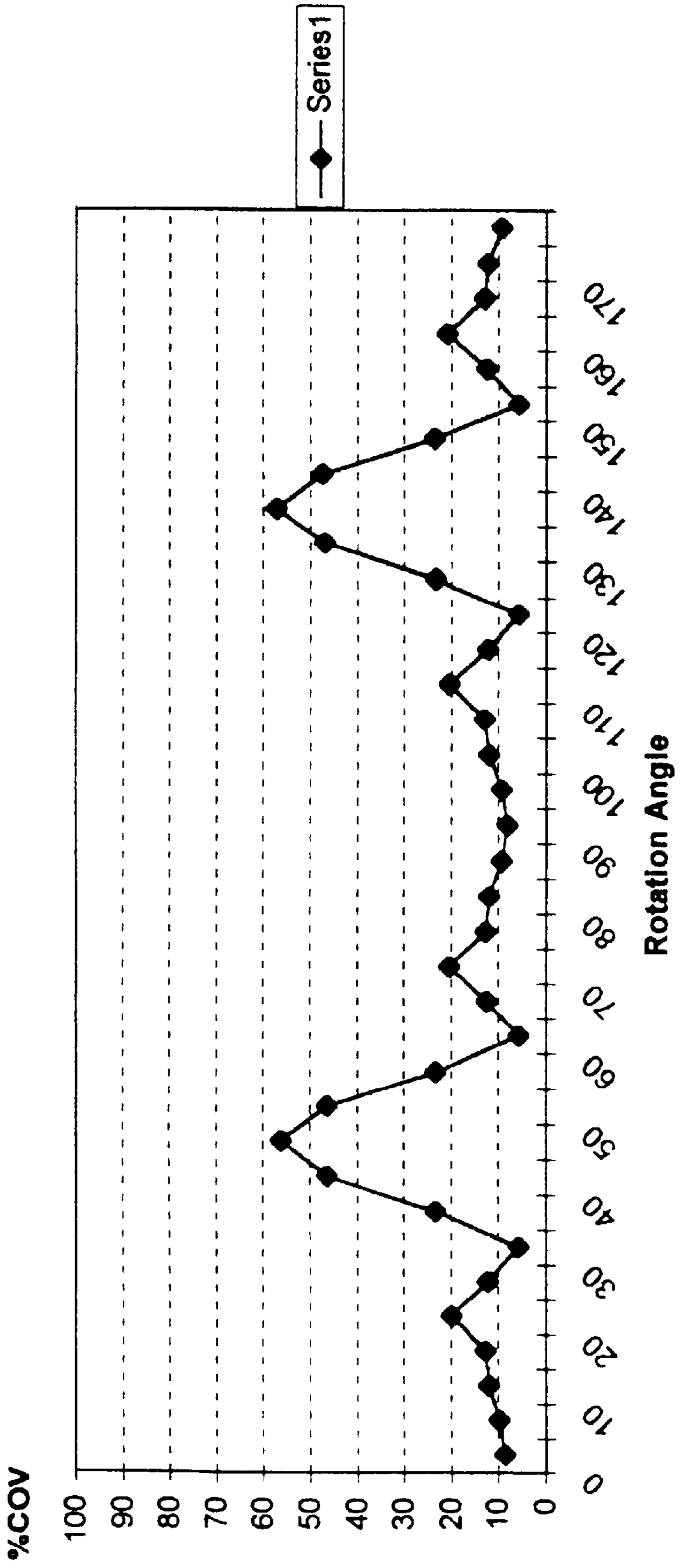
FIG. 32 shows plots six patterns tested using the Energy Suppression Factor method.
Figure 32B:
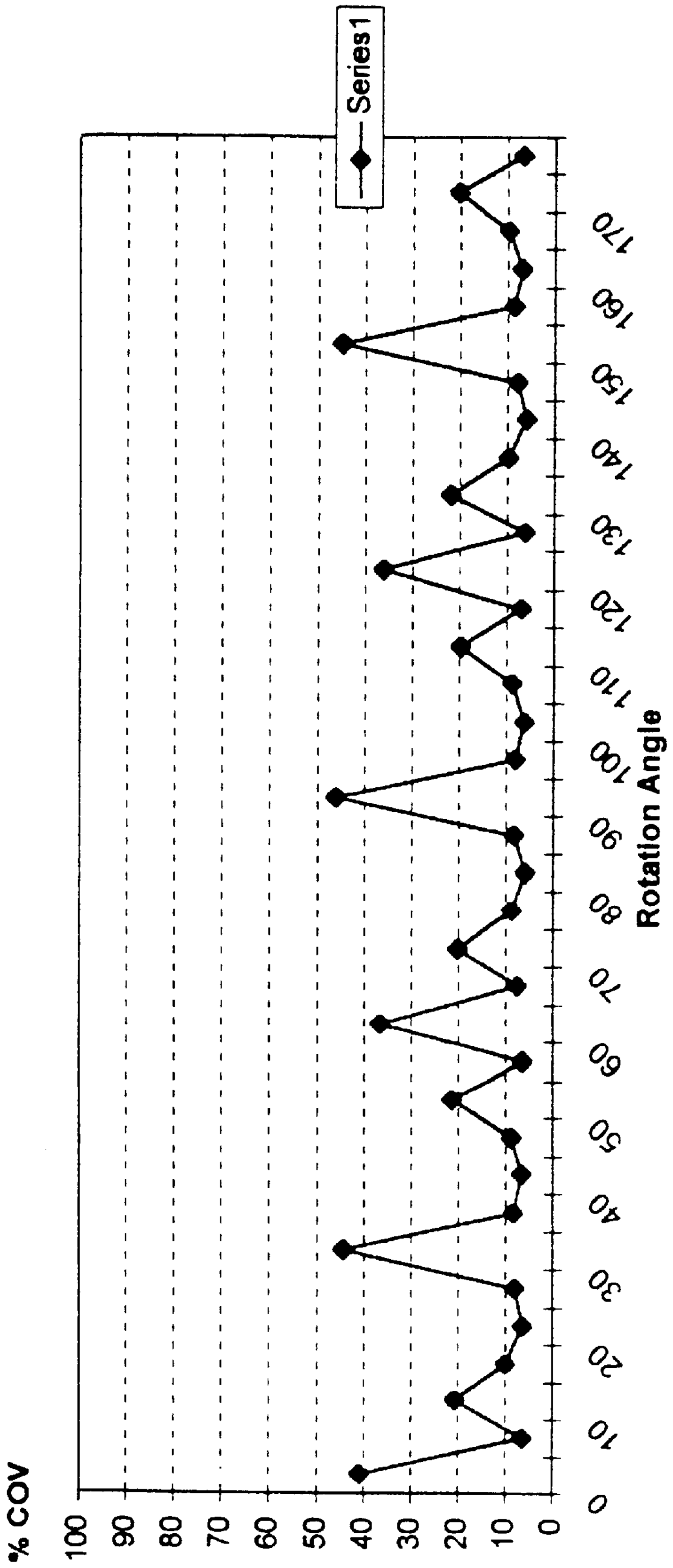
Figure 32C:
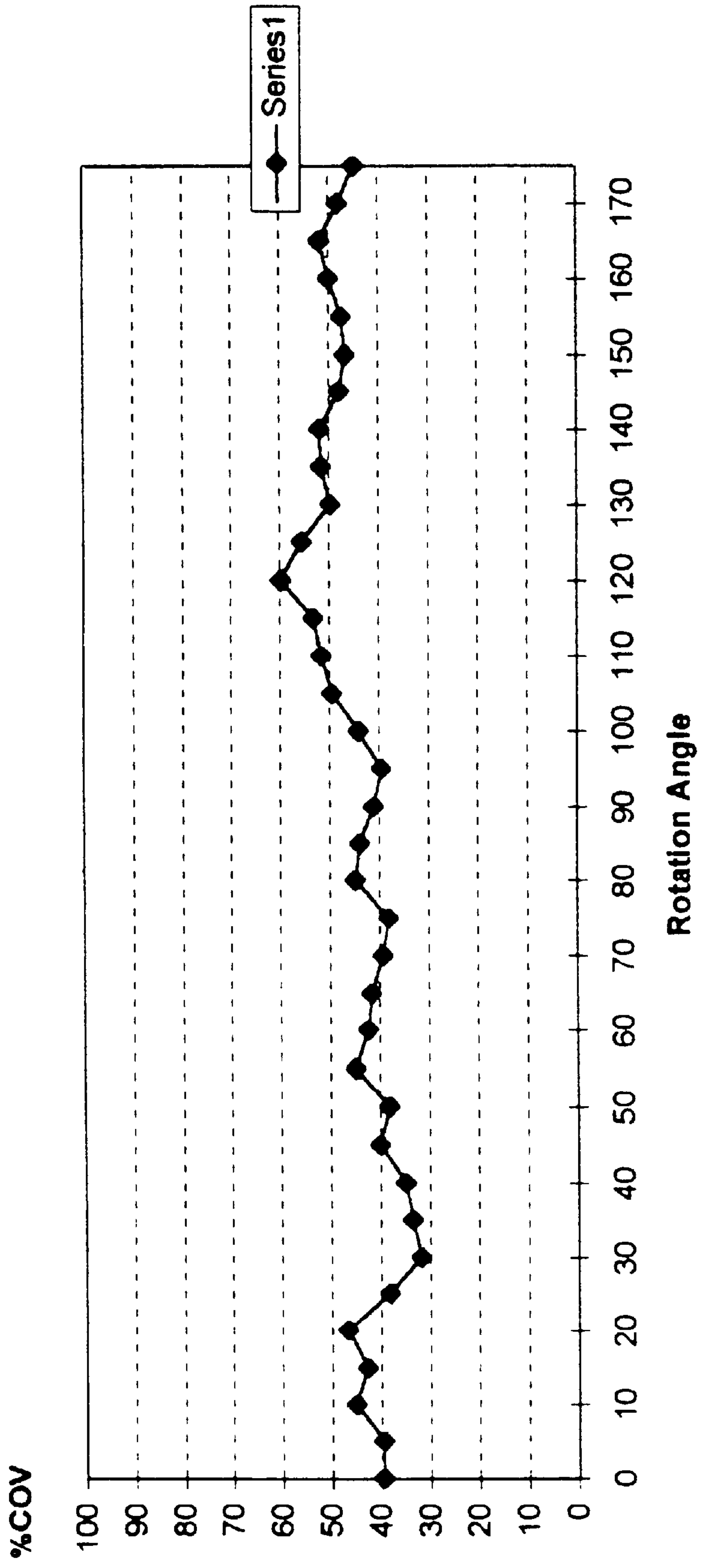
Figure 32D:
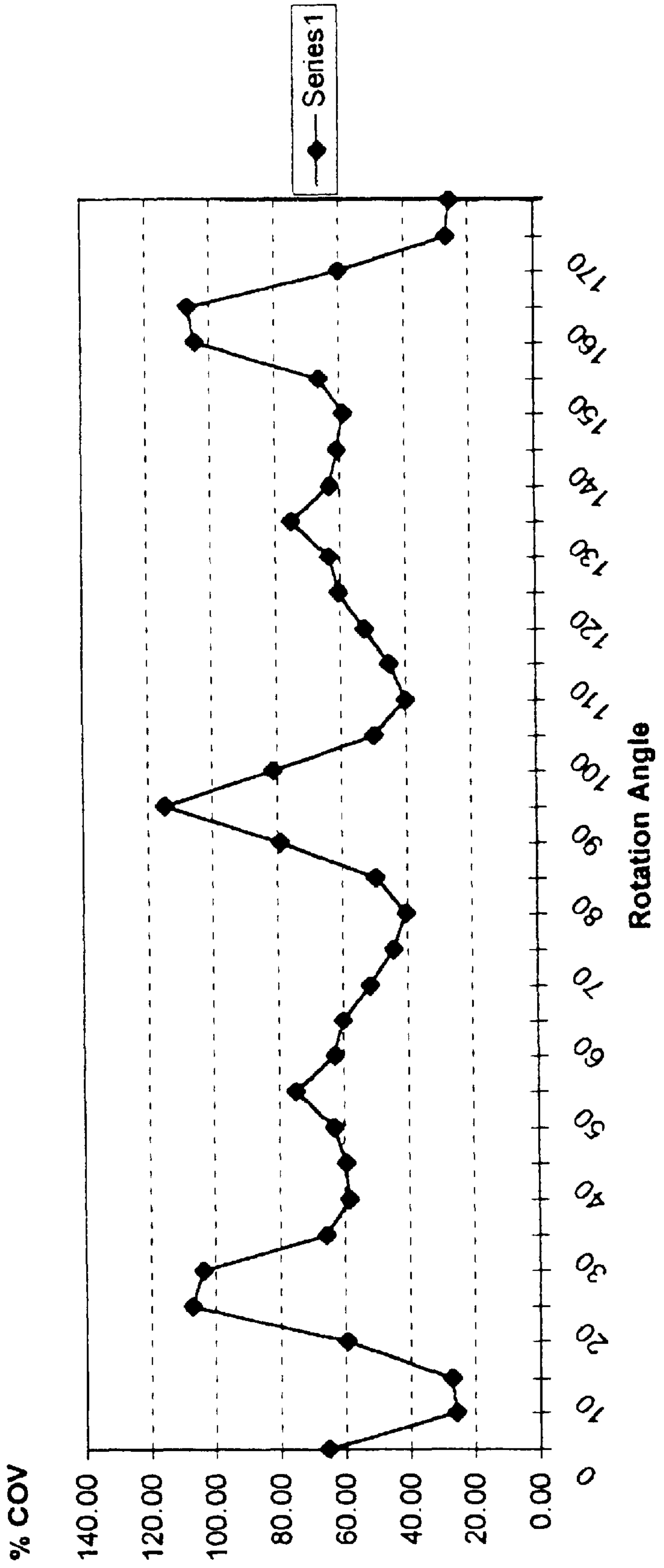
Figure 32E:
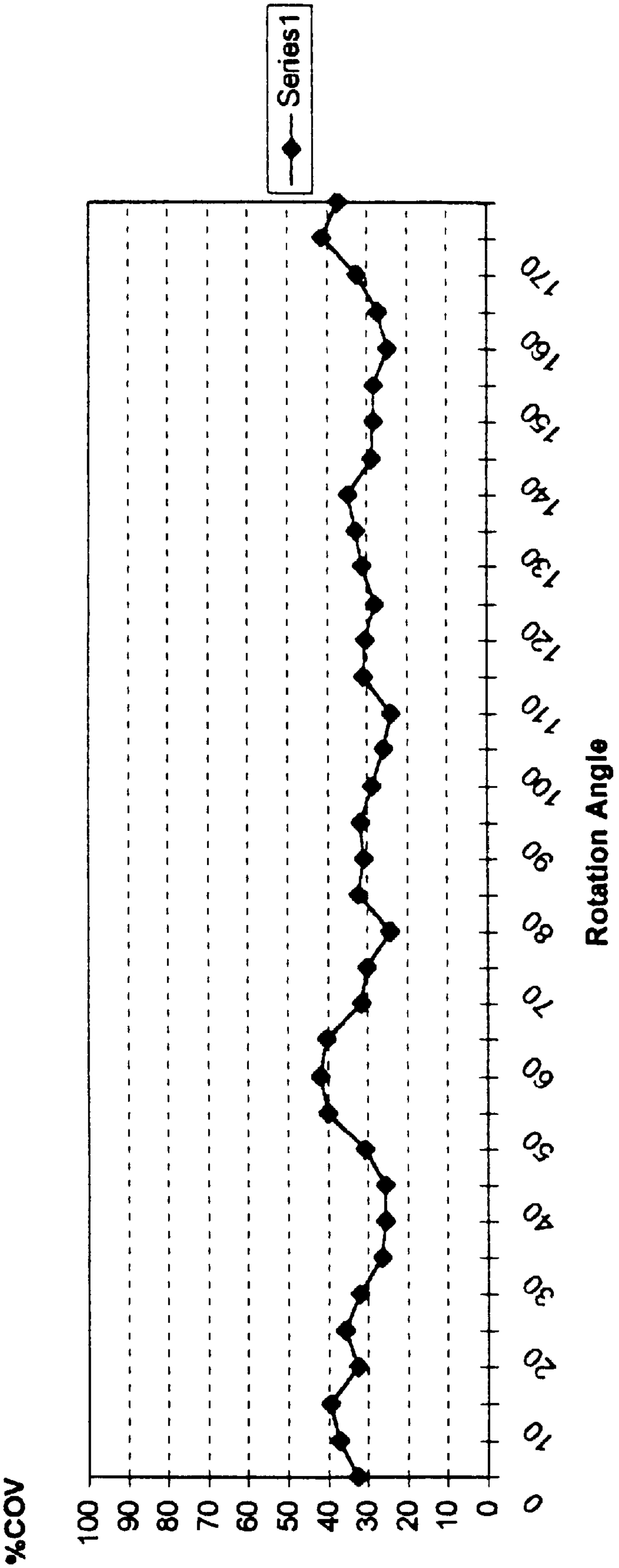
Figure 32F:
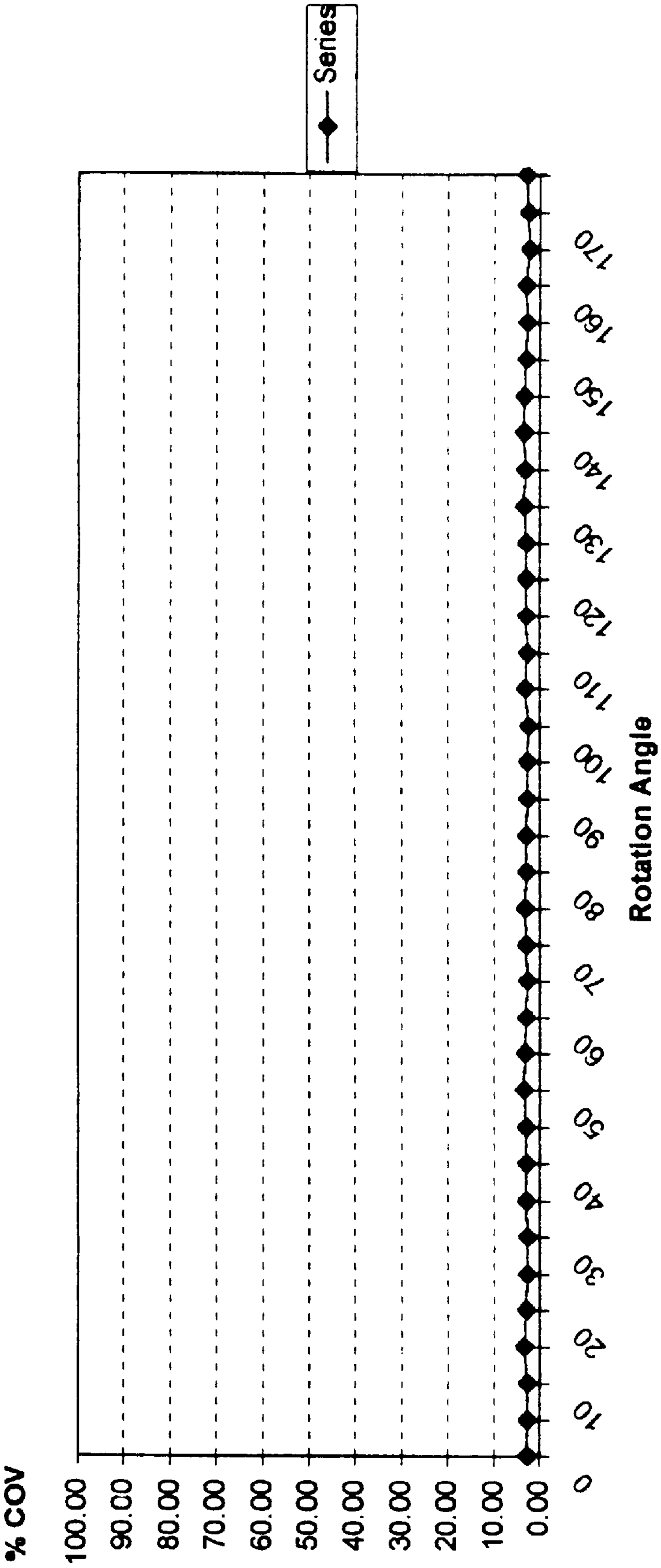

FIG. 30 shows a representation of data generated by the ESF method and highlights three key elements: (1) Histogram of percent pattern area data that are collected for all 114 marching frames; (2) Results and statistics block for the data; and, (3) The pattern image. From the set of percent area data, standard deviation and % COV are calculated (% COV=standard deviation/percent area×100). The standard deviation of the percent embossed or bonded area of the set of 114 frames at one angle is a measure of the regularity or irregularity of the pattern. The more irregular the pattern, the smaller the standard deviation. Dividing the standard deviation of the percent area by the mean percent area of all 114 frames effectively normalizes the measurement thereby becoming a useful comparative value (% COV). By repeating the marching frames for each 5 degree rotation from the original orientation allows detection of axis of symmetry. This will yield large changes in percent area (i.e., going from 0% to almost 100%). These axes and their complement exhibit peaks in % COV versus rotational position, and irregular patterns lack symmetry changes. Therefore the ESF over all angles gives a single statistic for measuring irregularity.

In order to execute this characterization, an IA computer program routine was written in Quantimet User Interactive Programming System (QUIPS) code. This program is shown in FIG. 31.

Alternatively, these measurements can also be made with a ruler, pencil, and stereological point counting. This historical technique allows an operator to count intercepts-with-feature-boundaries that occur when a straight-edge (e.g. ruler) is placed over an image. The intercept fraction is the stereological equivalent of area fraction (hence, percent area) used here by automatic equipment. This point-counting manual process is, of course, tedious and time-consuming, but equally as rigorous and sensitive.

FIG. 32 shows plots of rotation angle versus %COV for the six representative patterns; Checkerboard, Sparkle, Irregular Worm-Pin, Rupple, Irregular Butterfly, and Random Noise. Patterns possessing significant irregularity (e.g., Butterfly, Worm-Pin) yield relatively flat plots without spikes.

Figure 33:
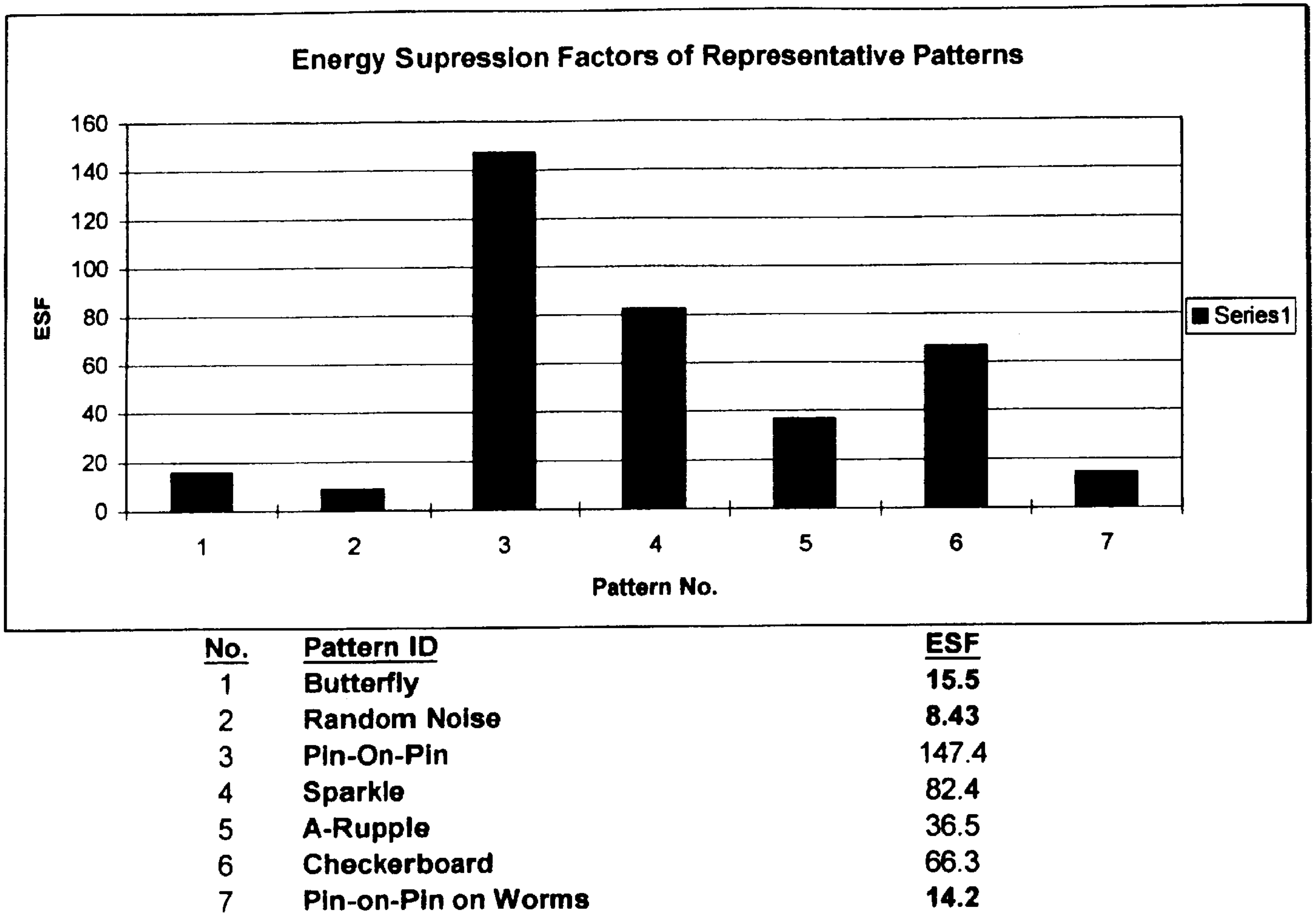
FIG. 33 shows the graphical comparison of the Energy Suppression Factor for the six representative patterns of FIG. 32.

Degree of pattern regularity can be numerically measured using the ESF which is the % COV from the % COVs obtained over all rotation angles. Taking the ESF over all 36 rotation angles acts to normalize the data independent of the percent area of the pattern. An irregular pattern has an ESF less than 25, while a regular pattern would have a higher ESF. FIG. 33 graphically shows the ESF for several representative patterns. ESF values between 8 and 25 are within the scope of the present invention. Preferably, the ESF range is between 8 and 16. Patterns within this range reduce the forces and vibrations produced at the bonding nip, thereby allowing increased machine speed.

Although the description of the preferred embodiment and method has been quite specific, modifications of the process of the invention could be made without deviating from the spirit of the presented invention. Accordingly, the scope of the present invention is dictated by the appended claims, rather than by the description of the preferred embodiment and method.

We claim:

1. A multi-ply web of cellulosic material with an irregular bonding pattern wherein the multi-ply web is produced by a process comprising the steps of:

passing a first web along a first embossing roll to provide protrusions forming a first pattern on the first web;

passing a second web along a second embossing roll to provide protrusions forming a second pattern on the second web wherein the first and second patterns are dissimilar in distribution on the web; and joining the first web and the second web to form a laminate such that the protrusions of the first web attach to the protrusions of the second web at a laminate interface to form a bonding pattern, wherein the area of attachment between the first protrusions and second protrusions is the bonding area, wherein the bonding area is between about 1% to 60% of the total area of the laminate.

2. The web of claim 1, wherein the bonding pattern is irregular in that the bonding pattern has a Self-Similarity Count of 1.

3. The web of claim 1, wherein the bonding pattern is irregular in that the bonding pattern has an Energy Suppression Factor of between 8 and 25.

4. A multi-ply web of cellulosic material comprising:

a first web having protrusions forming a first pattern;

a second web having protrusions forming a second pattern wherein the first and second patters are dissimilar;

wherein the protrusions of the first web are attached to the protrusions of the second web at a laminate interface to form a bonding pattern, wherein the area of attachment between the first protrusions and second protrusions is the bonding area;

wherein the bonding area is between about 1% to 60% of the total area of the combined web; and wherein the bonding pattern is irregular in distribution within the laminate interface.

5. The web of claim 4, wherein the bonding pattern is irregular in that the bonding pattern has a Self-Similarity Count of 1.

6. The web of claim 4, wherein the bonding pattern is irregular in that the bonding pattern has an Energy Suppression Factor of between 8 and 25.

7. The method of claim 4, wherein the bonding area is between about 3% and 24% of the total area of the combined web.

* * * * *